(12) United States Patent
Kazawa et al.

(10) Patent No.: US 8,184,976 B2
(45) Date of Patent: May 22, 2012

(54) PASSIVE OPTICAL NETWORK SYSTEM AND OPERATING METHOD THEREOF

(75) Inventors: Tohru Kazawa, Kokubunji (JP); Yusuke Yajima, Fujisawa (JP); Taishi Shinagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 585 days.

(21) Appl. No.: 12/388,104

(22) Filed: Feb. 18, 2009

(65) Prior Publication Data

US 2010/0080558 A1   Apr. 1, 2010

(30) Foreign Application Priority Data

Sep. 26, 2008  (JP) ................................. 2008-247083

(51) Int. Cl.
*H04J 14/00* (2006.01)
*H04B 10/00* (2006.01)
(52) U.S. Cl. .......................................... 398/67; 398/153
(58) Field of Classification Search .................... 398/67, 398/153

See application file for complete search history.

(56) References Cited

OTHER PUBLICATIONS

ITU-T, G.983.4, "A broadband optical access system with increased service capability using dynamic bandwidth assignment", pp. 1-81, Nov. 2001.*
ITU-T G.984.3, "Gigabit-capable Passive Optical Networks (GPON): Transmission convergence layer specification", pp. 1-108, Feb. 2004.*
ITU-T, G .983.4, "A broadband optical access system with increased service capability using dynamic bandwith assignment", pp. 1-81, Nov. 21, 2001.
ITU-T, G .984.1, "Gigabit-capable Passive Optical Networks (GPON): General Characteristics", pp. 1-14, Mar. 2003.
ITU-T, G.984.3, "Gigabit-capable Passive Optical Networks (GPON): Transmission convergence layer specification", pp. 1-108, Feb. 2004.

* cited by examiner

*Primary Examiner* — Nathan Curs
(74) *Attorney, Agent, or Firm* — Antonelli, Terry, Stout & Kraus, LLP.

(57) ABSTRACT

The passive optical network includes a master station and slave stations connected via an optical fiber network including an optical splitter and a plurality of optical fibers. The master station includes a bandwidth control unit which decides a volume of a transmission signal to be granted to each slave station in every first period and in accordance with a request from the slave station, and a transmission timing control unit which decides, in one of a plurality of second periods and in accordance with the decided volume of the signal, transmission timing in which the slave station should transmit a signal. When the signal is to be transmitted by division over the plurality of second periods, the bandwidth control unit or the transmission timing control unit is controlled based on a volume of a signal to be attached by division processing, so that the granted signal can be transmitted in the first period.

5 Claims, 20 Drawing Sheets

| TCONT-ID (901) | BYTE LENGTH (902) | BANDWIDTH ALLOCATION TYPE (903) |
|---|---|---|
| 0 | 4980 | DYNAMIC BANDWIDTH |
| 1 | 0 | DYNAMIC BANDWIDTH |
| ... | 0 | DYNAMIC BANDWIDTH |
| 2047 | 0 | DYNAMIC BANDWIDTH |
| 2048 | 21 | FIXED BANDWIDTH |
| ... | 21 | FIXED BANDWIDTH |
| 2485 | 21 | FIXED BANDWIDTH |
| 2486 | 21 | FIXED BANDWIDTH |
| 2487 | 21 | FIXED BANDWIDTH |
| ... | 21 | FIXED BANDWIDTH |
| 3075 | 21 | FIXED BANDWIDTH |
| 3076 | 21 | FIXED BANDWIDTH |
| 3077 | 21 | FIXED BANDWIDTH |
| ... | 21 | FIXED BANDWIDTH |
| 4095 | 21 | FIXED BANDWIDTH |

| TCONT-ID (901) | Start(byte) (1002) | End(byte) (1003) |
|---|---|---|
| 0 | 12 | 4990 |
| 1 | — | — |
| ... | — | — |
| 2047 | — | — |
| 2048 | 5002 | 5023 |
| ... | ... | ... |
| 2485 | 19391 | 19412 |
| 2486 | 19425 | 19439 |
| 2486 | 12 | 22 |
| 2487 | 35 | 46 |
| ... | ... | ... |
| 3075 | 19406 | 19427 |
| 3076 | — | — |
| 3076 | 12 | 32 |
| 3077 | 45 | 46 |
| ... | ... | ... |
| 3664 | 19415 | 19437 |
| 3665 | 12 | 32 |
| ... | ... | ... |
| 4095 | 14201 | 14223 |

Rows 0–2486 (first entry): FIRST PERIOD
Rows 2486 (second entry)–3076 (first entry): SECOND PERIOD
Rows 3076 (second entry)–3664: THIRD PERIOD
Rows 3665–4095: FOURTH PERIOD

| TCONT-ID (901) | BYTE LENGTH (902) | BANDWIDTH ALLOCATION TYPE (903) | ADDITIONAL BYTE LENGTH (1601) |
|---|---|---|---|
| 0 | 4980 | DYNAMIC BANDWIDTH | 0 |
| 1 | 0 | DYNAMIC BANDWIDTH | 0 |
| ... | 0 | DYNAMIC BANDWIDTH | 0 |
| 2047 | 0 | DYNAMIC BANDWIDTH | 0 |
| 2048 | 21 | FIXED BANDWIDTH | 0 |
| ... | 21 | FIXED BANDWIDTH | 0 |
| 2485 | 21 | FIXED BANDWIDTH | 0 |
| 2486 | 21 | FIXED BANDWIDTH | 10 |
| 2487 | 21 | FIXED BANDWIDTH | 0 |
| ... | 21 | FIXED BANDWIDTH | 0 |
| 3075 | 21 | FIXED BANDWIDTH | 0 |
| 3076 | 21 | FIXED BANDWIDTH | 10 |
| 3077 | 21 | FIXED BANDWIDTH | 0 |
| ... | 21 | FIXED BANDWIDTH | 0 |
| 4095 | 21 | FIXED BANDWIDTH | 0 |

| TCONT-ID | Start(byte) | End(byte) |
|---|---|---|
| 0 | 12 | 4991 |
| 1 | – | – |
| ... | – | – |
| 2047 | – | – |
| 2048 | 5003 | 5024 |
| ... | ... | ... |
| 2485 | 19391 | 19412 |
| 2486 | 19425 | 19439 |
| 2486 | 12 | 27 |
| 2487 | 40 | 60 |
| ... | ... | ... |
| 3075 | 19411 | 19432 |
| 3076 | – | – |
| 3076 | 12 | 43 |
| 3077 | 55 | 77 |
| ... | ... | ... |
| 3664 | 19425 | 19439 |
| 3664 | 12 | 18 |
| 3665 | 30 | 51 |
| ... | ... | ... |
| 4095 | 14219 | 14241 |

Rows 1–9 (TCONT-ID 0 through 2486 with 19425/19439): FIRST PERIOD
Rows 10–14 (TCONT-ID 2486 with 12/27 through 3076 with –/–): SECOND PERIOD
Rows 15–18 (TCONT-ID 3076 with 12/43 through 3664 with 19425/19439): THIRD PERIOD
Rows 19–21 (TCONT-ID 3664 with 12/18 through 4095): FOURTH PERIOD 1001: TCONT-ID  1002: Start(byte)  1003: End(byte)

PASSIVE OPTICAL NETWORK SYSTEM AND OPERATING METHOD THEREOF

BACKGROUND OF THE INVENTION

The present invention relates to a passive optical network system (hereinafter referred to as "PON") in which a plurality of subscriber connection devices share an optical transmission line.

A PON generally consists of an optical line terminator (hereinafter referred to as "OLT") and a plurality of optical network units (hereinafter referred to as "ONU"). In the PON, signals from terminals connected to the ONUs, such as personal computers (hereinafter referred to as "PC") or IP phones, are converted into optical signals, and the optical signals are transmitted to the OLT through branch optical fibers. The branch optical fibers from the ONUs are coupled by an optical splitter. The optical signals are optically multiplexed (by time division) on a trunk optical fiber connected to the optical splitter. Thus, the optical signals reach the OLT.

Each of the plurality of ONUs may be installed in any position as long as the distance between the OLT and the ONU satisfies the range defined in Chs. 8 and 9 of Recommendation G984.1 by the International Telecommunication Union (ITU-T). In other words, due to a variation in the transmission delay of an optical signal between the OLT and each ONU, there is a possibility that the optical signals outputted from the ONUs collide and interfere with each other on the trunk optical fiber if the transmission delay is not taken into consideration. For this reason, by using ranging technology defined in Ch. 10 of ITU-T Recommendation G984.3, the delays in the output signals of the ONUs are regulated so that the ONUs can look as if they had been set at an equal distance from the OLT. Further, by using dynamic bandwidth allocation (hereinafter referred to as "DBA") technology defined in ITU-T Recommendation 983.4, the OLT allocates bandwidths to as many ONUs as possible in accordance with requests from individual users so that each ONU can transmit a signal in the allocated bandwidth in timing defined by an instruction (hereinafter referred to as "grant instruction" or simply "grant") from the OLT. Thus, optical signals from the ONUs to the OLT can be prevented from colliding or interfering with each other on the trunk optical fiber.

A signal transmitted from each ONU to the OLT is referred to as "upstream signal". The upstream signal is a variable-length packet (hereinafter also referred to as "packet" simply) which consists of an overhead (which is a fixed-length overhead also referred to as "burst overhead") and burst data. The overhead includes a preamble and a delimiter. The burst data includes a variable-length payload signal. A guard time is set immediately before each packet so as to prevent the packet from chiding with any packet transmitted earlier. On the other hand, a signal transmitted from the OLT to each ONU is referred to as "downstream signal". The downstream signal is a 125-microsecond frame signal which consists of a frame synchronization pattern, a PLOAM, a grant instruction and a frame payload.

The grant instruction from the OLT using an area referred to as "US Bandwidth MAP" assigns an upstream signal transmission grant timing for each ONU. The grant instruction includes a Start value designating a start of transmission of an upstream signal in each ONU, and an End value designating an end of the transmission. The designation of each value is made in byte units. A non-signal area lies between the End value and a Start value of the next upstream signal. The non-signal area corresponds to the aforementioned guard time. A plurality of bandwidth allocation units called T-CONT (Transmission CONTainer) can be assigned to each ONU. For example, bandwidth allocation can be made for each service accommodated in one and the same ONU. Such a Start value and such an End value are assigned for each T-CONT. These values are also referred to as "grant values".

In a PON called a GPON defined in the aforementioned recommendation, a variable-length packet called a GEM (GPON Encapsulation Method) packet is transmitted from each ONU to the OLT. A 5-byte header called a GEM header is attached to the GEM packet. A length of the transmission signal, a flow label, and a flag indicating the presence/absence of processing called fragmentation which will be described later, are contained in the GEM header.

According to the aforementioned ITU-T recommendation, the OLT gives grant instructions to each ONU with a period of 125 microseconds. That is, the OLT transmits grants to specified ONUs with the 125-microsecond period, and the specified ONUs transmit data to the OLT while sharing the optical fiber by time division in accordance with the grants. If the OLT performs the aforementioned DBA with the 125-microsecond period, all the ONUs (or all the T-CONTs) can be notified of bandwidths assigned to themselves respectively directly as grant values by grants, and all the ONUs can output signals in accordance with the grants respectively. However, DBA in a real PON is not performed with the 125-microsecond period, but is mostly designed to be performed with a period longer than a period designated by a grant instruction, for example, with a period of 0.5 miliseconds or 1 milisecond for the following reason. That is, microsecond-order response time is not required in data communication such as Internet access. Accordingly, satisfactory bandwidth allocation can be secured for operation even if a processor having a low throughput of about several tens of MIPS spends a time of about 0.5 miliseconds or 1 milisecond on DBA which is high in calculation cost. That is, DBA may be performed with a period longer than a grant period.

The OLT decides data lengths for all the ONUs (T-CONTs) in DBA within a period of a multiframe of about 4 to 8 frames extending over 125-microsecond frame boundaries. The ONUs are allowed to transmit data with the decided lengths respectively. Therefore, on giving a grant from the OLT to each ONU, the OLT performs processing to divide the data length decided in DBA into a plurality of 125-microsecond frames and designate the data length as grant values in the respective frames. That is, a grant value for an ONU may be allocated over a frame boundary. Processing in this case is carried out by a mechanism called fragmentation defined in Ch. 8.3.2 of ITU-T Recommendation G984.3 so as to divide a signal from the ONU into two frames (or to generate another grant instruction).

According to the same recommendation, when the OLT divides data length allocated to an ONU (T-CONT) into a plurality of 125-microsecond frames in DBA, a GEM header must be also attached to each granted packet in the divided frames. In original DBA, data length is allocated to each ONU by the OLT while the length of one (5-byte) GEM header which must be attached to the head of any packet is taken into consideration as described previously. However, the length of GEM headers which must be attached to the second and later ones of the divided packets is not taken into consideration. Therefore, when a grant given to an ONU is divided over a plurality of 125-microsecond frames, the data volume of a signal the ONU could have transmitted originally is reduced by GEM headers attached to packets received in the second and later 125-microsecond frames according to the recommendation.

For example, assume that up to 64 ONUs are connected to the OLT, and 32 VoIP services are accommodated in each ONU. When dynamic bandwidth allocation (DBA) is performed with the aforementioned T-CONTs being associated with the individual VoIP services, the OLT should execute DBA for the VoIP services upon 2,048 T-CONTs individually. Here, assume that each VoIP service requires an upstream communication bandwidth of 256 kbit/sec. When the OLT executes DBA with a period of 0.5 miliseconds on this assumption, the OLT must provide 256 kbit/sec×0.5 miliseconds/8=16 bytes for each T-CONT. In addition, the OLT should execute DBA in consideration of one (5-byte) GEM header which is required to be attached to the head of data. Therefore, the OLT should give each T-CONT a grant to transmit data of 16+5=21 bytes. To transmit data of 21 bytes every 0.5 miliseconds means each T-CONT will consume a bandwidth of 21×8/0.5 miliseconds/1000=336 kbit/sec. When the 2,048 VoIP services are in use simultaneously, a bandwidth of 336 kbit/sec×2048=688.128 Mbit/sec is consumed in the PON as a whole.

If the upstream signal rate from each ONU to the OLT is 1.24416 Gbit/sec (hereinafter often rounded to 1.2 Gbit/sec), the volume of data which can be transmitted in 125 microseconds corresponding to the grant instruction period can be expressed by 1.24416 Gbit/sec×125 microseconds/8=19440 bytes. The aforementioned data of 21 bytes can be indeed put in the data length of 19,440 bytes corresponding to one grant instruction period. However, when the data of 21 bytes are laid over the boundary between frames of 125 microseconds corresponding to the grant instruction period unfortunately, a phenomenon that the data of 21 bytes are divided into two upstream frames will occur due to the mechanism called fragmentation. According to the mechanism, for example, the data of 21 bytes may be divided into 15 bytes in the first frame and 6 bytes in the next frame. In this case, a packet of the first 15 bytes consists of a GEM header of 5 bytes and a payload of 10 bytes, while a packet of the next 6 bytes consists of a GEM header of 5 bytes, which must be attached due to the division according to the recommendation, and a payload of 1 byte. Thus, in spite of a signal length of 21 bytes allocated by DBA, a payload part of only 10+1=11 bytes can be transmitted substantially. Data of about 31% to the data of 16 bytes satisfying the required bandwidth of 256 kbit/sec will be untransmitted, thereby causing great influence on the communication quality.

The layout of a signal from each ONU (T-CONT) on an upstream frame differs from one DBA period to another DBA period. It is therefore impossible to know in advance whether a specific upstream signal will or not lie over boundaries among a plurality of 125-microsecond frames so as to cause fragmentation. If it is assumed that there is a possibility that fragmentation occurs in data from all the T-CONTs, redundant grant length may be allocated to all the T-CONT signals in view of 5-byte GEM headers which should be attached additionally. In such a manner, even if fragmentation occurs, untransmitted data as described previously will not appear. Thus, deterioration of communication quality can be avoided. However, a bandwidth required therefor will reach (21+5)×8/0.5 miliseconds/1000=416 kbit/sec per T-CONT. A bandwidth of 416 kit/sec×2048=851.986 Mbit/sec will be consumed in the PON as a whole, thereby resulting in a large useless bandwidth.

SUMMARY OF THE INVENTION

An object of the invention is to provide a PON which accommodates a large number of terminals dealing with data having a small data length, such as VoIP data, wherein an OLT or ONUs and the PON can prevent quality from deteriorating in spite of occurrence of fragmentation, and useless bandwidth can be suppressed to the utmost. Another object of the invention is to provide an operating method (bandwidth allocation method) thereof.

In order to solve the foregoing problems, a PON according to the invention is designed so that when fragmentation occurs, the volume of transmission data which must be increased due to the fragmentation is grasped, and bandwidth allocation is performed also in consideration of the increased volume.

That is, the present invention provides a passive optical network system in which a master station and a plurality of slave stations are connected via an optical fiber network including an optical splitter and a plurality of optical fibers, and the master station decides volumes and timings of signals to be transmitted from the plurality of slave stations to the master station individually in accordance with requests from the plurality of slave stations, and receives the signals from the plurality of slave stations multiplexed on the optical fiber network, wherein the master station includes: a bandwidth control unit which decides a volume of a transmission signal to be granted to each slave station in every first period and in accordance with the requests from the plurality of slave stations; a transmission timing control unit which decides a transmission timing in which the slave station should transmit the signal in one of a plurality of second periods in accordance with the decided volume of the signal; and a control unit by which, when the signal is to be transmitted by division over the plurality of second periods, the bandwidth control unit and/or the transmission timing control unit are controlled based on a volume of a signal to be attached due to the division, so that the granted signal can be transmitted within the first period.

The control unit may be designed so that when a signal to be attached due to the division prevents a part of the granted signal from being transmitted, the signal prevented from being transmitted can be also transmitted within a subsequent first period.

Allocated bandwidths in a PON can be prevented from being reduced due to fragmentation which is apt to appear particularly when small bandwidths of about 100 kbit/sec are allocated to a large number of T-CONTs. It is therefore possible to prevent communication quality from deteriorating.

BRIEF DESCRIPTION OF THE DRAWINGS

FIG. 9 is a memory configuration diagram showing an example of the configuration of an allocated byte length table;

FIG. 10 is a memory configuration diagram showing an example of the configuration of a transmission timing table;

FIG. 14 is a memory configuration diagram showing another example of the configuration of the allocated byte length table according to the present invention;

FIG. 15 is a memory configuration diagram showing another example of the configuration of the transmission timing table;

DESCRIPTION OF THE EMBODIMENTS

The configuration and operation of a PON according to the present invention will be described below with reference to the drawings along the configuration and operation of a GPON defined in ITU-T Recommendation G984 by way of example.

Figure 1:
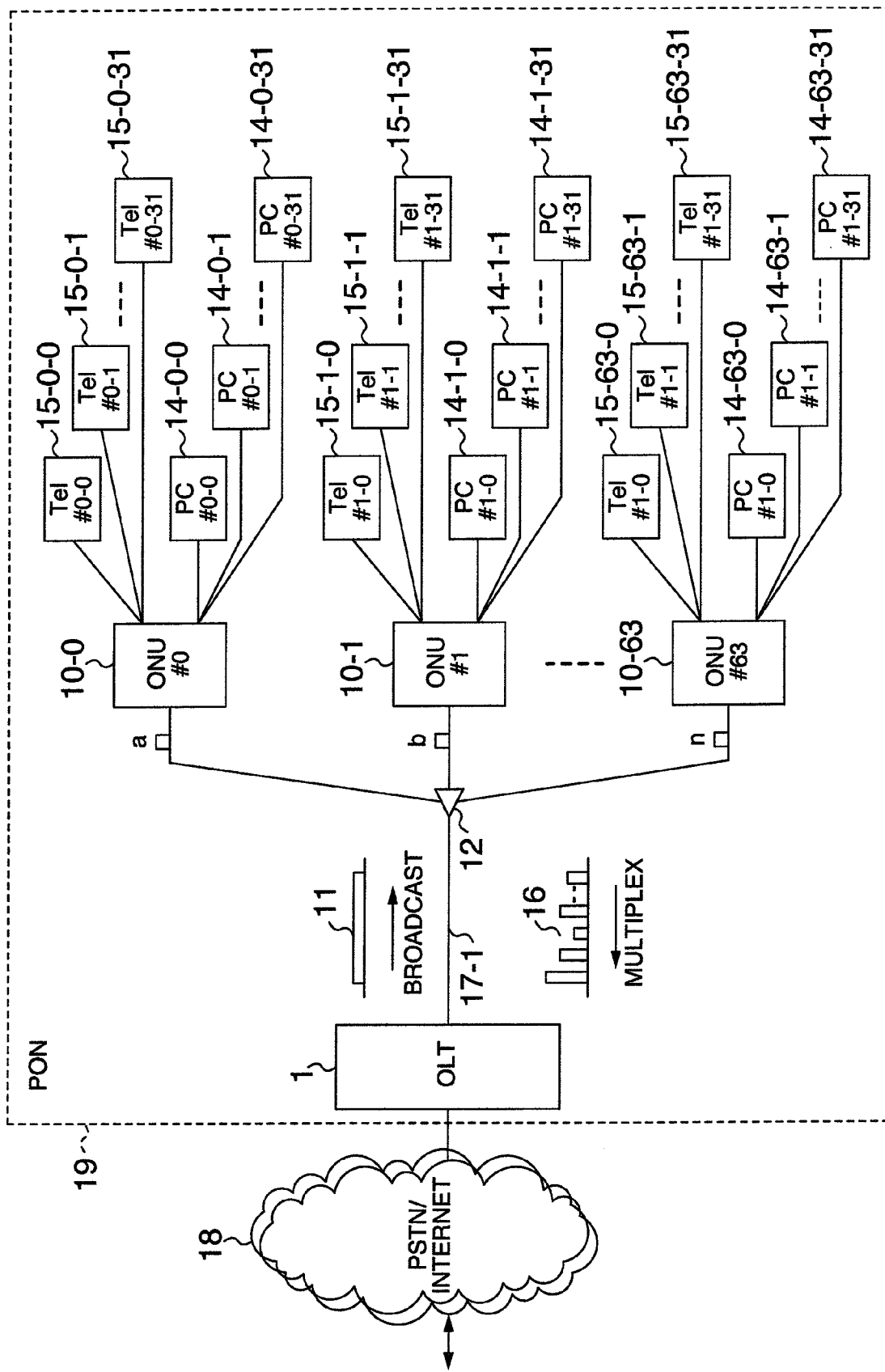
FIG. 1 is a network configuration diagram showing an example of the configuration of an optical access network using a PON according to the present invention.

FIG. 1 is a network configuration diagram showing an example of the configuration of an optical access network using a PON according to the present invention.

A PON 19 is constituted by an optical splitter 12, an OLT 1 which is a carrier-side device installed in a carrier's office building or the like, a trunk optical fiber 17-1 connecting the OLT 1 and the optical splitter 12, a plurality of ONUs 10 (10-0 to 10-63) which are subscriber-side devices installed in or near subscribers' homes, and a plurality of branch optical fibers 17-2 connecting the ONUs 10 to the optical splitter 12 respectively. The OLT 1 can be connected to up to 64 ONUs 10 through the trunk optical fiber 17-1, the optical splitter 12 and the branch optical fibers 17-2. Each of the plurality of ONUs 10 is connected with user terminals such as telephones 15, PCs 14, etc. for VoIP communication. The PON 19 is connected to a public switched telephone network (hereinafter referred to as "PSTN") or the Internet 18 through the OLT 1. Thus, the PON 19 can transmit and receive data to and from such a higher level network.

FIG. 1 shows three ONUs 10. In a downstream signal 11 transmitted from the OLT 1 to the ONUs 10, signals addressed to the respective ONUs 10 have been multiplexed by time division. The signal 11 is broadcast to all the ONUs 10. On receiving the signal 11, each ONU 10 checks whether the signal is addressed to itself or not. If the signal is addressed to the ONU 10, the ONU 10 distributes the signal to the telephone 15 or the personal computer 14 according to the destination of the signal. On the other hand, in the upstream direction from the ONUs 10 to the OLT 1, signals transmitted from the ONUs 10, such as a signal a transmitted from the ONU 10-1, a signal b transmitted from the ONU 10-2 and a signal n transmitted from the ONU 10-63, are optically time-division multiplexed into a signal 16 on the trunk optical fiber 17-1 by the optical splitter 12, and then the signal 16 reaches the OLT 1. Owing to DBA which will be described later, the OLT 1 can know from which ONU 10 and at what timing a signal will reach the OLT 1. Specifically, the OLT 1 is designed as follows. That is, the OLT 1 gives each ONU 10 an instruction about the timing when the ONU 10 should output a signal. The OLT 1 identifies the signal received from the ONU 10 at that timing, and performs processing correspondingly thereto.

Figure 2:
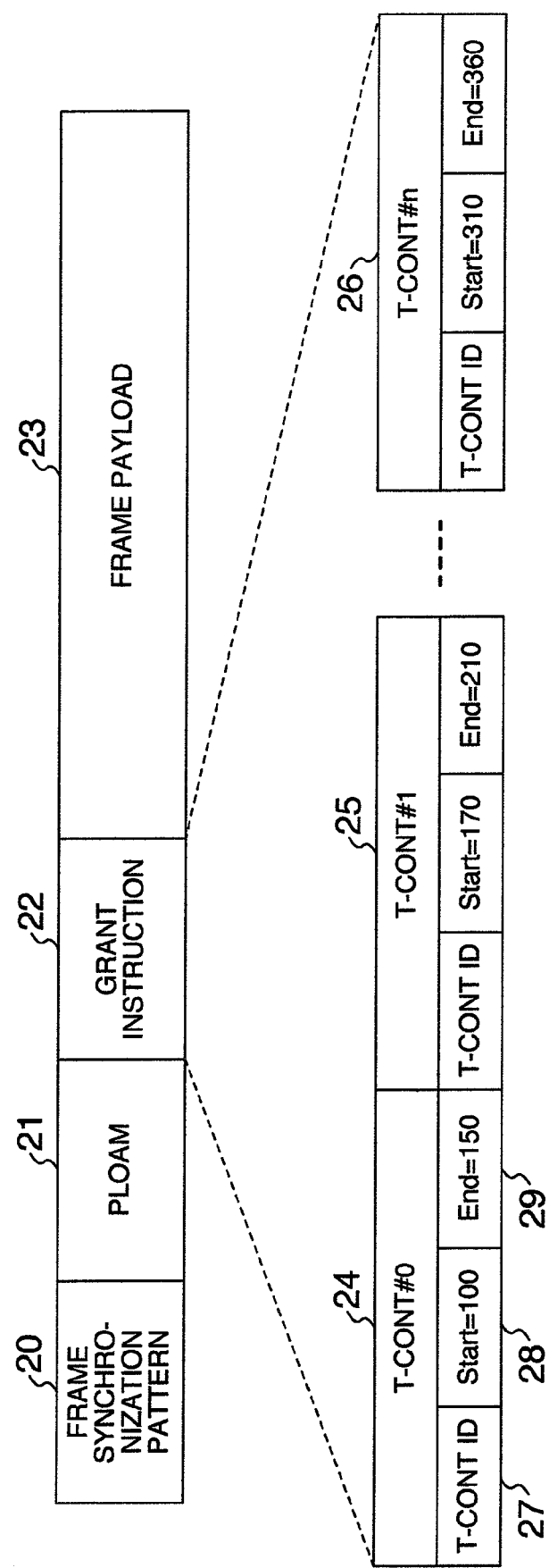
FIG. 2 is a frame configuration diagram showing an example of the configuration of an optical signal (downstream signal) from an OLT to each ONU.

FIG. 2 is a frame configuration diagram showing an example of the configuration of an optical signal (downstream signal) transmitted from the OLT to each ONU. The downstream signal (hereinafter also referred to as "downstream frame" or simply "frame") consists of a frame synchronization pattern 20, a PLOAM 21, a grant instruction 22 and a frame payload 23 as defined in ITU-T Recommendations G.984.3. The frame payload 23 stores a user signal to be transmitted from the OLT 1 to each ONU 10. The grant instruction 22 specifies a transmission timing (grant) of an upstream signal from each ONU 10, and particularly specifies a grant for each T-CONT that is a user signal control unit inside each ONU 10. FIG. 2 shows an example of a configuration corresponding to the configuration shown in FIG. 1, including a T-CONT#0 signal 24 for controlling the ONU 10-0, a T-CONT#1 signal 25 for controlling the ONU 10-1 and a T-CONT# n signal 26 for controlling the ONU 10-63. Each of the T-CONT signals consists of a T-CONT ID 27 for identifying a T-CONT, a Start value 28 designating a transmission start timing of a signal, and an End value 29 designating a transmission end timing of the signal. The Start value 28 and the End value 29 are specified in byte units. The OLT 1 periodically transmits to each ONU 10 a message, including the grant instruction 22, which permits the ONU 10 to transmit upstream data. Thus, the OLT 1 instructs each ONU 10 about how much of the upstream communication bandwidth should be used for each T-CONT. The Start value 28 and the End value 29 are pieces of information respectively indicating the timings at which data transmission should be started and ended in each period with which the OLT 1 will transmit the grant instruction. The OLT 1 may specify not the End value 29 but the length of data to be transmitted and instruct each ONU 10 to transmit data with the specified data length at the timing indicated by the Start value 28.

Figure 3:
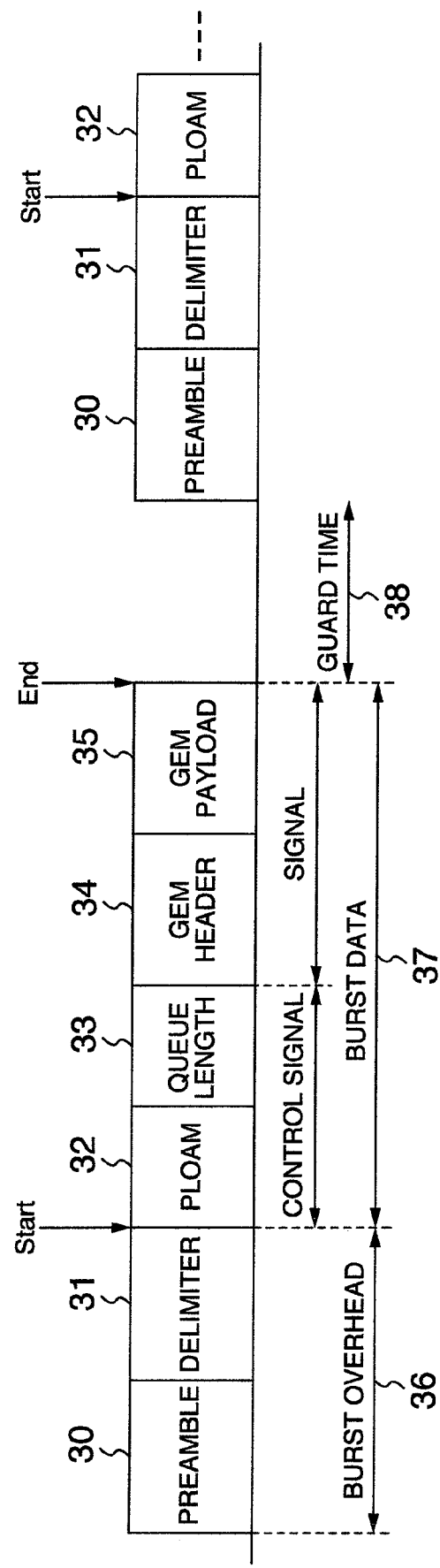
FIG. 3 is a signal configuration diagram showing an example of the configuration of an optical signal (upstream signal) from each ONU to the OLT.

FIG. 3 is a signal configuration diagram showing an example of the configuration of an optical signal (upstream signal) from each ONU to the OLT. The upstream signal (hereinafter also referred to as "GEM packet" or simply "packet") is a variable-length packet consisting of a fixed-length burst overhead 36 and burst data 37. The burst overhead 36 includes a preamble 30 and a delimiter 31. The burst data 37 includes a control signal (including a PLOAM 32 and a queue length value 33), a 5-byte GEM header 34 and a variable-length GEM payload 35. The aforementioned Start value 28 indicates a start position of the PLOAM 32, i.e., a start position of the burst data 37. The End value 29 indicates an end position of the GEM payload 35 (burst data 37). A guard time 38 represents a no-signal section from the end position of the GEM payload 35 to the start position of the preamble 30 of the next packet. Length defined in ITU-T Recommendations G.984.3 is secured as the no-signal section in order to prevent packets transmitted from the ONUs 10 from colliding or interfering with each other on the trunk optical fiber 17-1. Thus, due to the guard time 38, the preamble 30 and the delimiter 31 lying between the burst data 37 transmitted from the ONUs 10 (or T-CONTs), an interval of several bytes is produced between the End value 29 of the preceding burst data 37 and the Start value 28 of the following burst data 37.

Figure 4:
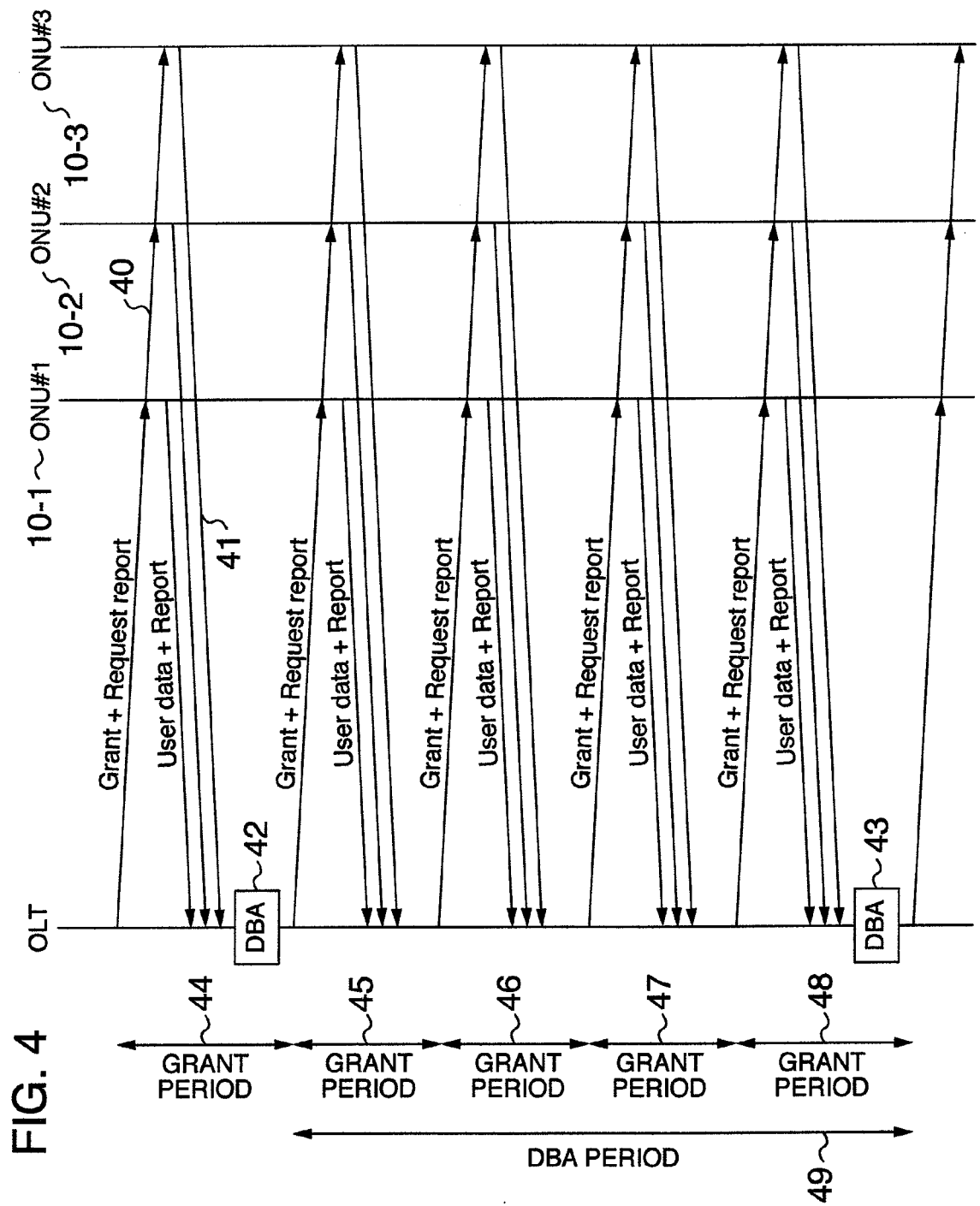
FIG. 4 is a sequence diagram showing an example of the operation of the PON.

FIG. 4 is a sequence diagram showing an example of the operation of the PON. FIG. 4 shows the relationship between the operation and period of DBA and the operation and periods of grants resulting from the DBA.

The OLT 1 transmits a transmission grant message 40 including the grant instruction 22 to each ONU 10-1 to 10-3 in every grant period of 125 microseconds. The transmission grant message 40 also includes information (request report) for requesting report of the volume of queued data accumulated in a transmission queue placed in each T-CONT of each ONU. Each ONU 10 transmits data accumulated in the transmission queue in a time slot specified by the Start value 28 and the End value 29 of the grant instruction 22, and at the same time, reports the volume of queued data to the OLT 1 by use of a queue length value 33 included in an upstream message 41 (packet shown in FIG. 3).

With a predetermined period, the OLT 1 performs DBA 42-43 for deciding the volume of transmission data to be granted to each ONU 10 (T-CONT) based on a report (volume of queued data) received from the ONU. Specifically, the volume of transmission data to be granted to each T-CONT in subsequent transmission is decided based on the volume of queued data and an agreement with each user. For the aforementioned reason, it is not necessary to perform such DBA in every 125-microsecond grant period 45-48, but the DBA may be performed once for a plurality of grant periods. In this embodiment, the DBA is designed to be performed once for four grant periods (0.5 miliseconds). The volumes of transmission data to be granted to all the T-CONTs can be decided by one DBA 42. Therefore, in one of the plurality of grant periods 45-48, the OLT 1 determines T-CONTs allowed to transmit data in each grant period, and the Start value 28 and the End value 29 with which each T-CONT should transmit the data, so that all the T-CONTs can transmit the decided volumes of data respectively. The Start value 28 and the End value 29 are transmitted (granted) to each ONU 10-1 to 10-3 with the transmission grant message 40 including the grant instruction 22. Each ONU 10-1 to 10-3 transmits data to the OLT 1 at the timing corresponding to the grant. Although the embodiment will be described below on the PON with a DBA period of 0.5 miliseconds and a grant period of 125 microseconds, it is noted that the DBA period and the grant period may take other values.

Figure 5:
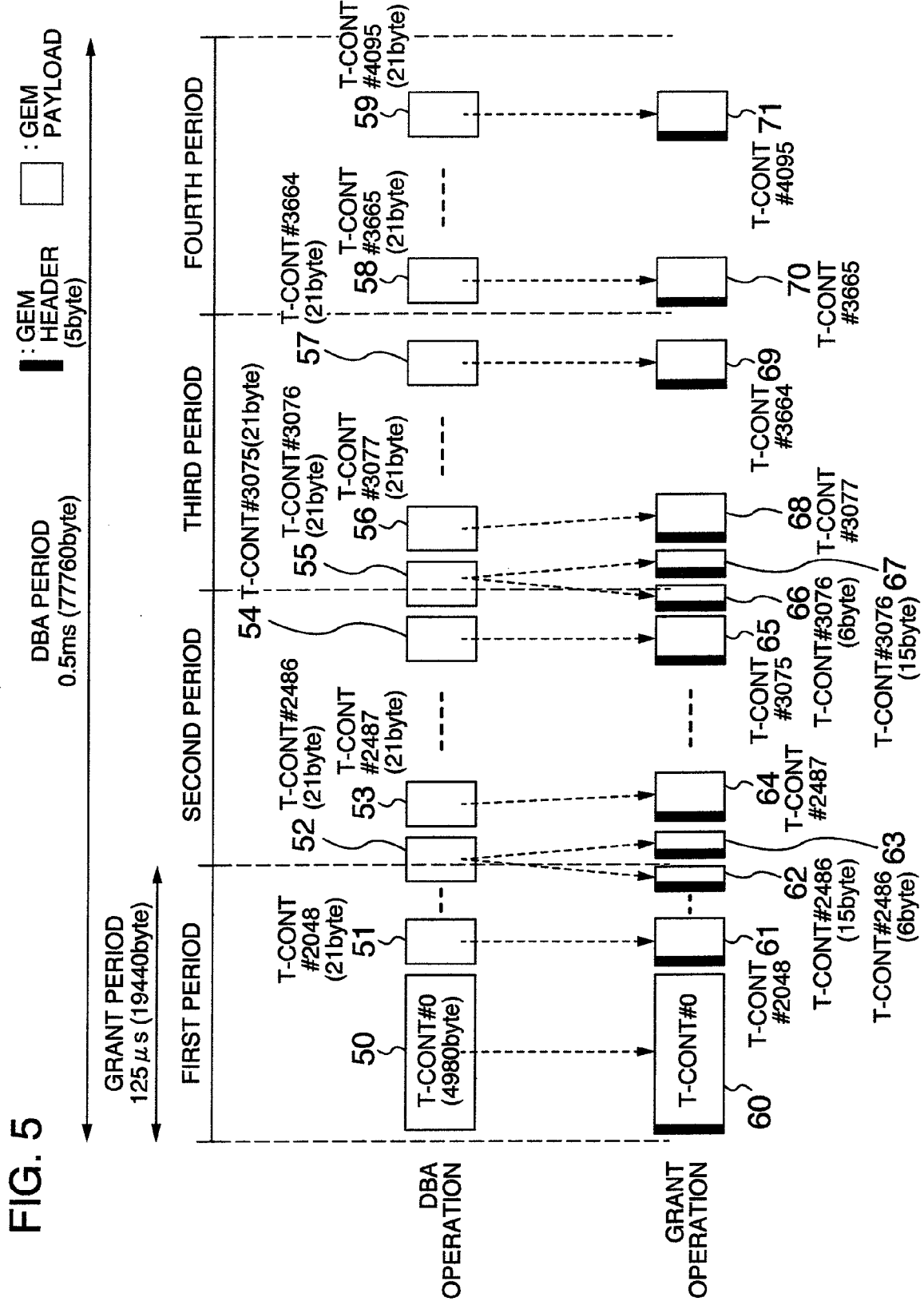
FIG. 5 is an explanatory diagram showing an example of the operation of a PON.

FIG. 5 is an explanatory diagram showing an example of the operation of a PON. FIG. 5 explains the operation of a background-art PON which does not perform fragmentation processing according to the present invention. FIG. 5 explains the decision of the volumes of data in DBA operation and the state where the result of the decision has been reflected in grants. This explanation shows the state where DBA is performed upon 4,096 T-CONTs #0-#4095 with a DBA period of 0.5 microseconds, and the decided volumes of transmission data are allocated by grants among four 125-microsecond grant periods included in the DBA period. Here, when it is assumed that the upstream signal rate is about 1.2 Gbits/sec, the data length that can be transmitted during each DBA period is 77,760 bytes and the data length that can be transmitted during each grant period is 19,440 bytes.

The following description will be made on an example where the OLT 1 grants 4,980-byte data 50 to the T-CONT #0, nothing to the T-CONTs #1 to #2047, and 21-byte data 51-59 to the T-CONTs #2048-#4095 respectively. Each granted volume of data includes a 5-byte GEM header as shown in FIG. 3. However, due to the grant period of 125 microseconds, the OLT 1 must give grants to the T-CONTs #0 to #4095 every 19,440 bytes so as to specify their data transmission timings. The OLT in this explanation gives the grants to the T-CONTs in numerical order of the T-CONTs. That is, in the first grant period, the OLT 1 gives the T-CONT #0 a grant for data 60 (where data 50 decided in DBA will be put) and the T-CONT #2048 a grant for data 61 (where data 51 decided in DBA will be put), and subsequently gives grants to the following T-CONTs #2049-#2485 in an ascending numerical order of the T-CONTs so as to fill the data area in the first grant period. Data 52 decided for the T-CONT #2486 reach the end of the first grant period and extend over a plurality of grant periods. Thus, the OLT 1 performs fragmentation processing and gives the T-CONT #2486 a grant for data 62 in the rest of the first grant period and a grant for data 63 in the second grant period. The data 63 include the remaining data which cannot be transmitted in the first grant period. Subsequently in the same manner, the OLT 1 performs fragmentation processing upon the T-CONT #3076 and gives the T-CONT #3076 a grant for data 66 (part of data 55) in a remaining part of the second grant period and a grant for data 67 (rest of the data 55) in the third grant period.

In the example shown in FIG. 5, a phenomenon called fragmentation, in which data of a T-CONT crossing the boundary between grant periods are divided into a plurality of sets of data, has occurred in the T-CONT #2486 and the T-CONT #3076. For example, the data 52 of the T-CONT #2486 are divided into two sets of data 62 and 63 by grant operation and the data 62 and 63 are transmitted from the T-CONT #2486. The data 55 of the T-CONT #3076 are divided into two sets of data 66 and 67 by grant operation. As described previously, when data are divided over a plurality of grant periods by fragmentation in a GPON, a 5-byte header called a GEM header (34 in FIG. 3) must be attached to data in each grant period. Black-painted portions in heads of packets shown in the row of grant operation of FIG. 5 designate GEM headers, while the other outline portions of the packets designate GEM payloads (35 in FIG. 3). A GEM header according to the recommendation is attached to each of the divided data 62 and 63 of the T-CONT #2486. In the background-art PON, DBA is performed to decide the transmission data length granted to each ONU on the assumption that the OLT will attach one GEM header to the head of data. That is, the background-art PON does not imagine the aforementioned fragmentation of data. Therefore, when the OLT wants to make the T-CONT #2486 transmit 16-byte data, 21 bytes which are obtained by adding 5 bytes of a GEM header to 16 bytes of the data are decided in DBA as the transmission data length granted to the T-CONT #2486. However, when the 21 bytes are divided into 15 bytes in the first grant period and the rest 6 bytes in the second grant period due to fragmentation as shown in FIG. 5, 5 bytes of the 6 bytes provided in the second grant period are consumed by the additionally attached GEM header. Thus, only one byte can be transmitted as essential data. That is, even if signal transmission of a total of 21 bytes consisting of 5 bytes for a GEM header and 16 bytes for data is decided in DBA, 5 bytes of the data corresponding to the GEM header cannot be transmitted once fragmentation occurs. Finally only 11 bytes of the 16-byte data can be transmitted. Due to such a phenomenon, the communication quality deteriorates.

Not to say, the 5 bytes of the data which could not be transmitted can be transmitted if the 5 bytes are processed in the following DBA period as will be described later. However, such a configuration increases the delay of data transmission. The configuration may be regarded as unusable due to its communication quality in the case where real time performance is required in VoIP or the like.

It can be considered that a bandwidth set in consideration of an additional GEM header is allocated in DBA to each T-CONT where it is forecast that fragmentation will occur. In general DBA, however, data length to be granted to each T-CONT is changed in every DBA period based on queue length information reported by each ONU. That is, it is difficult to forecast in which T-CONT fragmentation will occur, and it is necessary to check fragmentation in every DBA period.

The PON according to the present invention is therefore designed so that when fragmentation occurs because a grant to a T-CONT decided by DBA extends over a boundary between grant periods, the T-CONT is given a grant where 5 bytes of a GEM header to be attached to data in the later grant period have been added. The configurations and operations of the PON and the OLT according to the present invention and the operating method (bandwidth allocation method) thereof will be described below more in detail with reference to the drawings.

Figure 6:
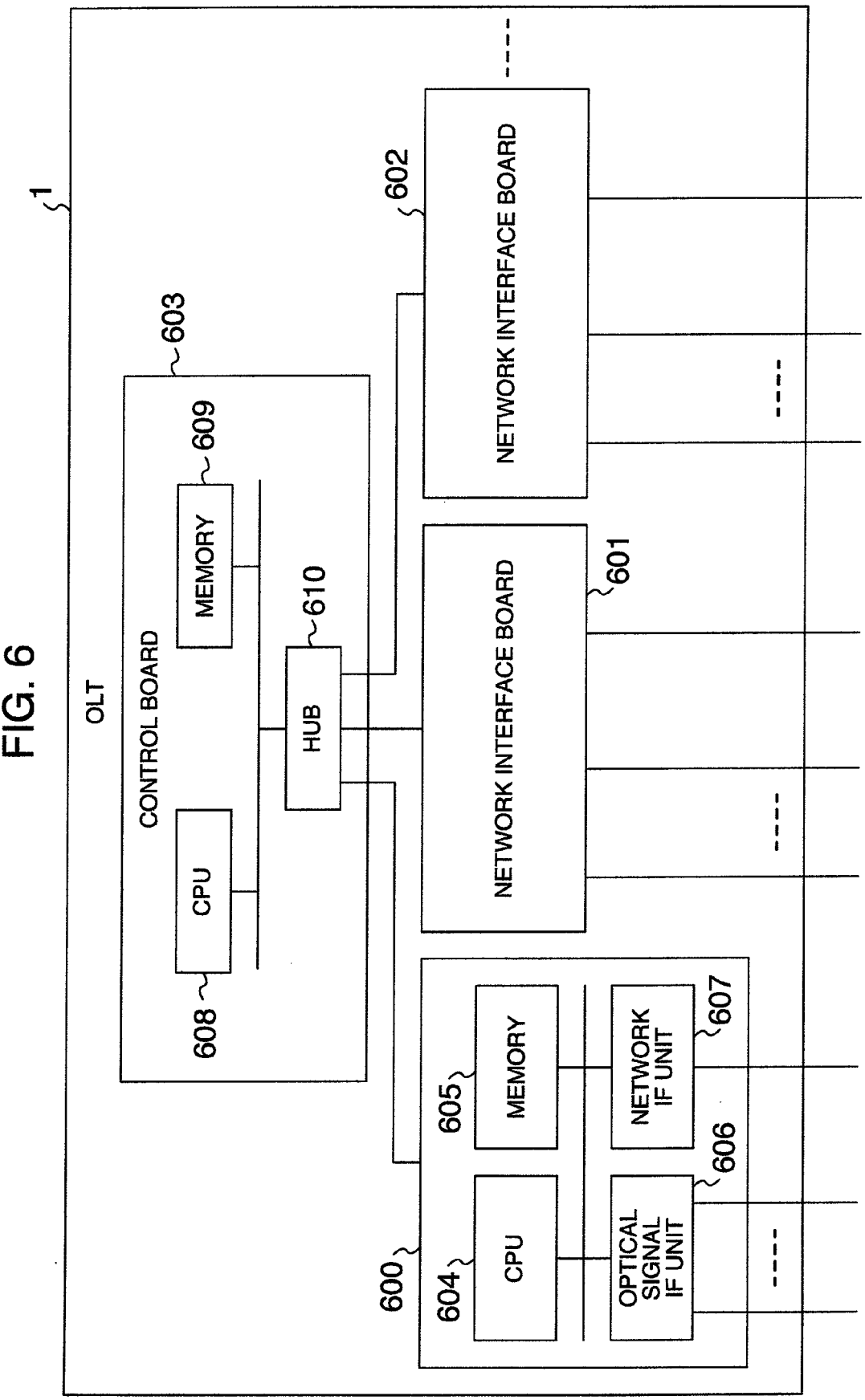
FIG. 6 is a block configuration diagram showing an example of the configuration of the OLT according to the present invention.

FIG. 6 is a block configuration diagram showing an example of the configuration of the OLT for use in the PON according to the present invention.

The OLT 1 is constituted by a control board 603 for managing the operation of the device as a whole and a plurality of network interface boards 600-602 connected to the network for transmitting and receiving signals. The control board 603 has a CPU 608 and a memory 609 and controls the network interface boards 600-602 through a HUB 610. Each of the network interface boards 600-602 has an optical signal IF (interface) unit 606, a network IF (interface) unit 607, a CPU 604 and a memory 605. The optical signal IF unit 606 serves to transmit and receive optical signals to and from the ONUs 10. The network IF unit 607 serves to transmit and receive signals to and from a higher level network 18 such as the Internet. The CPU 604 and the memory 605 serve to execute processing required for transmitting and receiving signals between each ONU 10 and the higher level network 18. For various kinds of actions and operations which will be described below, the CPU 604 executes programs stored in the memory 605. Not to say, these functions may be implemented by processing executed by special-purpose hardware (e.g. LSI) dedicated to each part of the processing in accordance with necessity. The hardware configuration of the OLT 1 is not limited to that in the aforementioned description but various modifications may be made properly in accordance with necessity.

Figure 7:
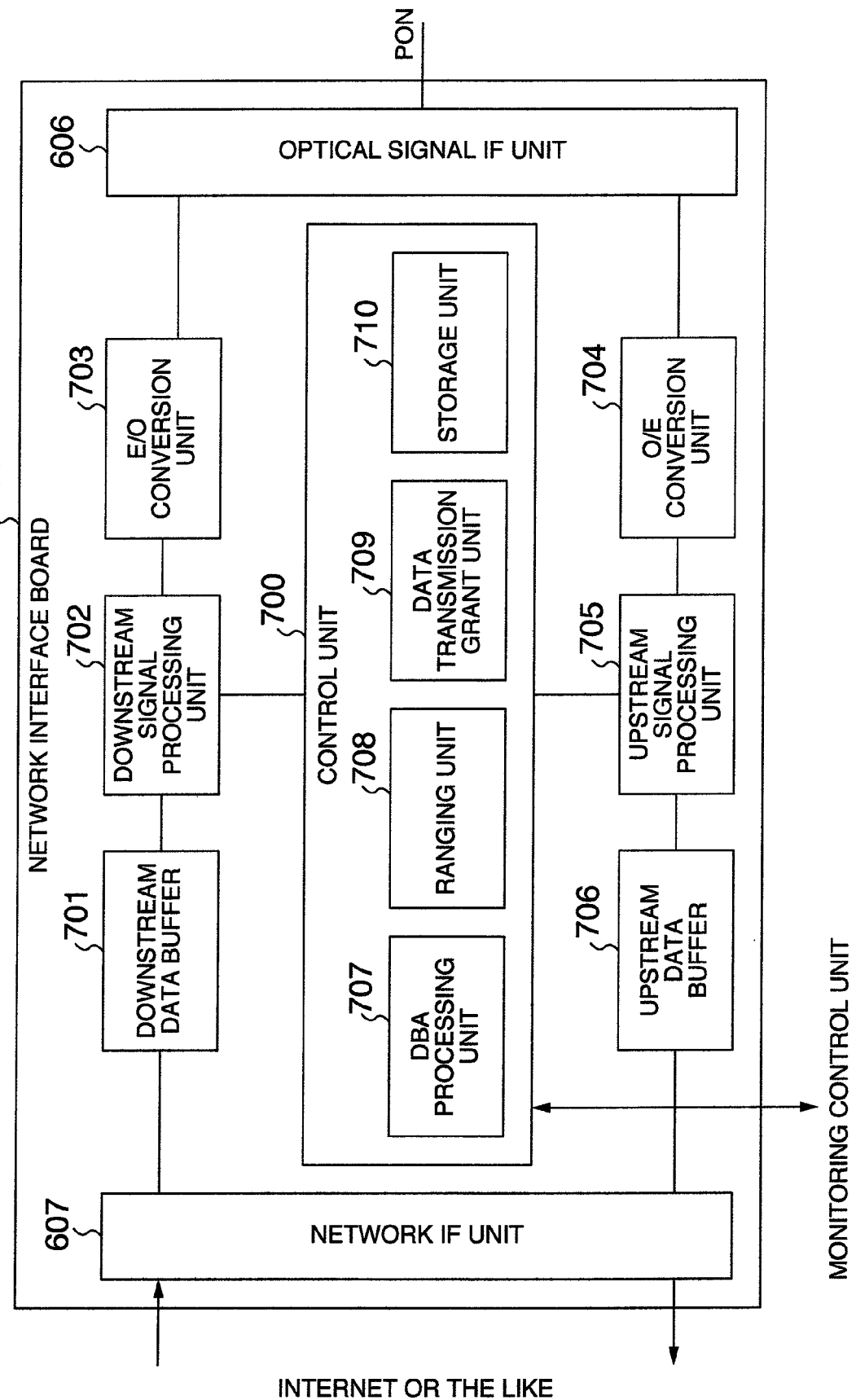
FIG. 7 is a block configuration diagram showing an example of the detailed partial configuration of the OLT.

FIG. 7 is a block configuration diagram showing an example of the configuration of the network interface board provided in the OLT.

A downstream data buffer 701 temporarily accumulates data received from the higher level network 18 through the network IF unit 607. A downstream signal processing unit 702 performs processing required for relaying optical signals from the higher level network 18 to the ONUs 10. An E/O conversion unit 703 converts electric signals into optical signals, and transmits the optical signals (downstream signals) to the ONUs through the optical signal IF unit 606. An E/O conversion unit 704 converts optical signals received from the ONUs 10 through the optical signal IF unit 606 into electric signals. An upstream signal processing unit 705 performs processing required for relaying signals from the ONUs 10 to the higher level network 18. An upstream data buffer 706 temporarily accumulates data to be transmitted to the higher level network 18 through the network IF unit 607. A control unit 700 is connected to the aforementioned function blocks.

The control unit 700 has functions to execute various kinds of required processings for communication with (monitoring, control, etc. of) a plurality of ONUs 10 or to relay signals between the higher level network 18 and each ONU 10.

A DBA processing unit 707 performs a dynamic bandwidth allocation process for every predetermined DBA period (0.5 miliseconds in this embodiment). The process decides how much of communication bandwidth should be allocated to each of the plurality of ONUs 10 (T-CONTs) covered by the OLT in the DBA period. The communication bandwidth designates, of the total byte length that can be transmitted in one DBA period, how many bytes should be allocated to each ONU 10 (T-CONT). A ranging unit 708 transmits each ONU a ranging signal for measuring a distance prior to the data transmission and reception between the OLT 1 and the ONU 10, and measures the time it takes to receive a response to the ranging signal. Based on the response time, the ranging unit 708 calculates the distance between the OLT 1 and each ONU 10 and adjusts the transmission delay time of a signal from the ONU 10 to the OLT 1 so as to prevent the signal from colliding or interfering with a signal from any other ONU 10. When the OLT 1 notifies each ONU 10 of the transmission delay time, the ONU 10 transmits data at a timing obtained by adding the notified transmission delay time to the data transmission timing (grant) granted in DBA by the OLT 1. A data transmission grant unit 709 decides a timing Start (28 in FIG. 2) and a timing End (29 in FIG. 2) in byte length based on the granted byte length of data transmission for each ONU 10 decided by the DBA processing unit 707. The timing Start designates the timing when each ONU 10 should start data transmission in a grant period and the timing End designates the timing when the ONU 10 should end the transmission in the grant period. Thus, the data transmission grant unit 709 gives a grant instruction to each ONU 10. A storage unit 710 is a memory for storing information necessary for the processings of the control unit 700. The control unit 700 is designed to communicate with a monitoring control unit (e.g. a maintenance terminal constituted by a PC) installed in the PON, so that control parameters (such as ONU subscription conditions, contract traffic, etc.) required for control can be set in the control unit in advance, or monitoring information (such as the state of failure occurrence, the volume of data granted to each ONU, etc.) can be received in accordance with a request from a maintainer.

Figure 8:
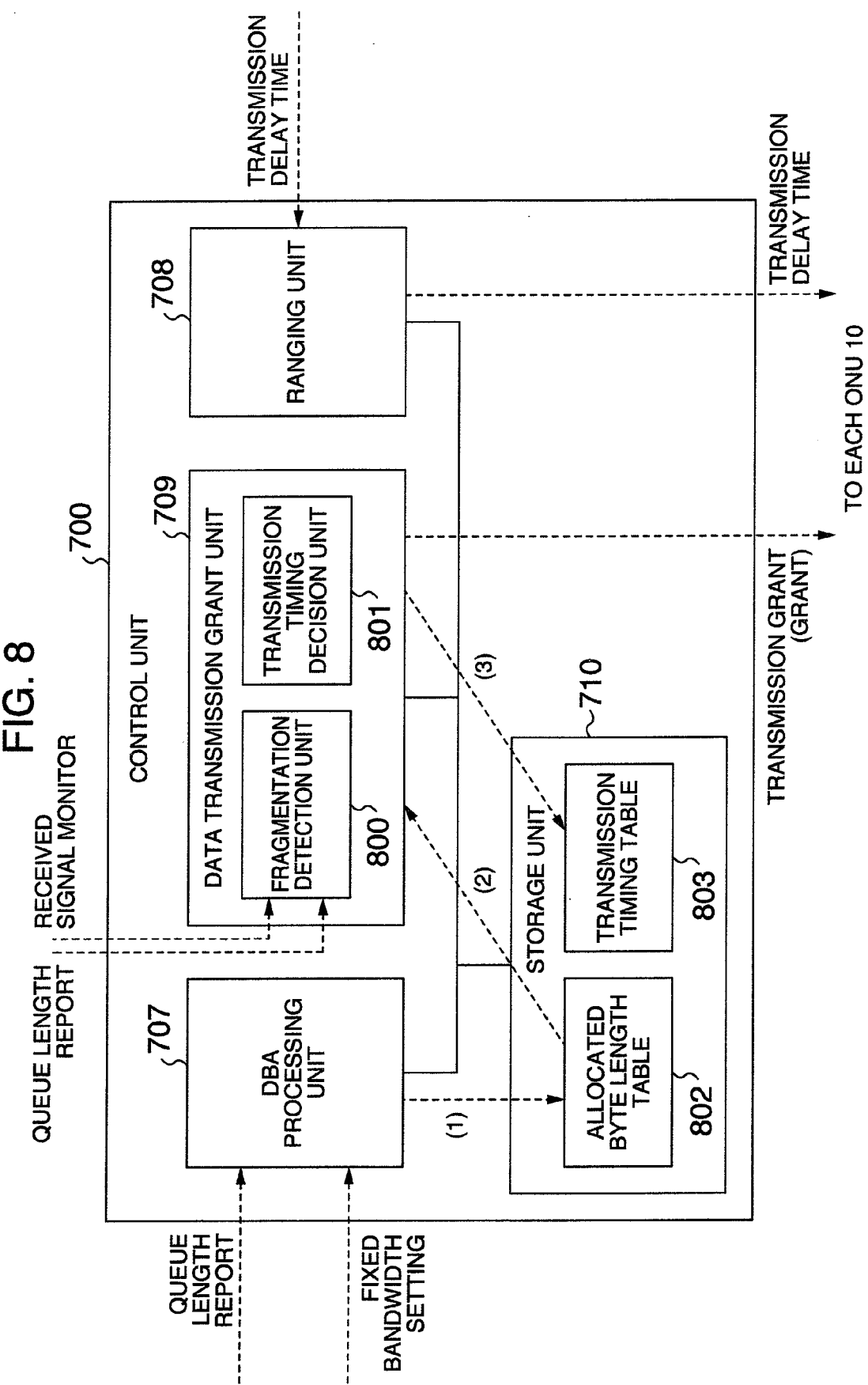
FIG. 8 is an explanatory diagram showing an example of the configuration and operation of a control unit.

FIG. 8 is an explanatory diagram for explaining an example of the configuration and operation of the control unit installed in the OLT.

From the queue length value (33 in FIG. 3) contained in the upstream signal, the DBA processing unit 707 receives the volume of transmission-queued data (queue length report) held by each ONU 10. Parameters about the volumes of transmission data that can be granted to ONUs (including fixed bandwidths etc.) have been set in the DBA processing unit 707 based on contracts. Based on the received volume of transmission-queued data and the communication bandwidth parameters set by contracts, the DBA processing unit 707 decides the data volume (communication bandwidth) to be granted to each ONU 10 in byte length and in every DBA period. The DBA processing unit 707 creates an allocated byte length table 802 where T-CONT-IDs serving as T-CONT identifiers of each ONU have been associated with the allocated byte lengths respectively, and stores the table 802 in the storage unit 710 ((1) in FIG. 8). FIG. 9 shows an example of the configuration of the table 802. The allocated byte length table 802 has an information field of T-CONT-ID 901 indicating the identifier of each T-CONT, an information field of byte length 902 allocated to the T-CONT in DBA, and an information field of allocated bandwidth class 903. The allocated bandwidth class 903 designates the class of the bandwidth allocated to each T-CONT. That is, the allocated bandwidth class 903 shows whether the bandwidth allocated to each T-CONT should be dynamically allocated in every DBA period based on the queue length reported by each ONU 10 or fixedly allocated based on the bandwidth setting information from the monitoring control unit independently of the queue length.

A transmission timing decision unit 801 provided in the data transmission grant unit 709 reads out the contents of the allocated byte length table 802 ((2) in FIG. 8). In every grant period the transmission timing decision unit 801 assigns a time slot corresponding to the byte length 902 allocated to each T-CONT, creates a transmission timing table 803 where the T-CONT-IDs are associated with the byte lengths allocated in the grant periods respectively, and stores the transmission timing table 803 in the storage unit 710 ((3) in FIG. 8). Here, a fragmentation detection unit 800 provided in the data transmission grant unit 709 may detect the occurrence of fragmentation where data of byte length allocated to a T-CONT are divided and allocated to time slots of a plurality of grant periods. On this occasion, the transmission timing decision unit 801 is instructed to add to the byte length a length of 5 bytes for a GEM header to be attached additionally to the latter part of the data divided by the fragmentation. The transmission timing decision unit 801 allocates time slots based on the number of bytes obtained by the addition. Further, the transmission timing decision unit 801 transmits a transmission grant message including a grant instruction 22 to each ONU 10 in accordance with the contents of the created transmission timing table 803 so as to notify the ONU 10 of the timing when the ONU 10 should transmit data. FIG. 10 shows an example of the configuration of the table 803. The transmission timing table 803 is designed to have a T-CONT-ID 901 serving as the identifier of each T-CONT, a Start area 1002 storing a data transmission start timing Start 28 in a grant period and an End area 1003 storing a data transmission end timing End 29 in the grant period.

Figure 11:
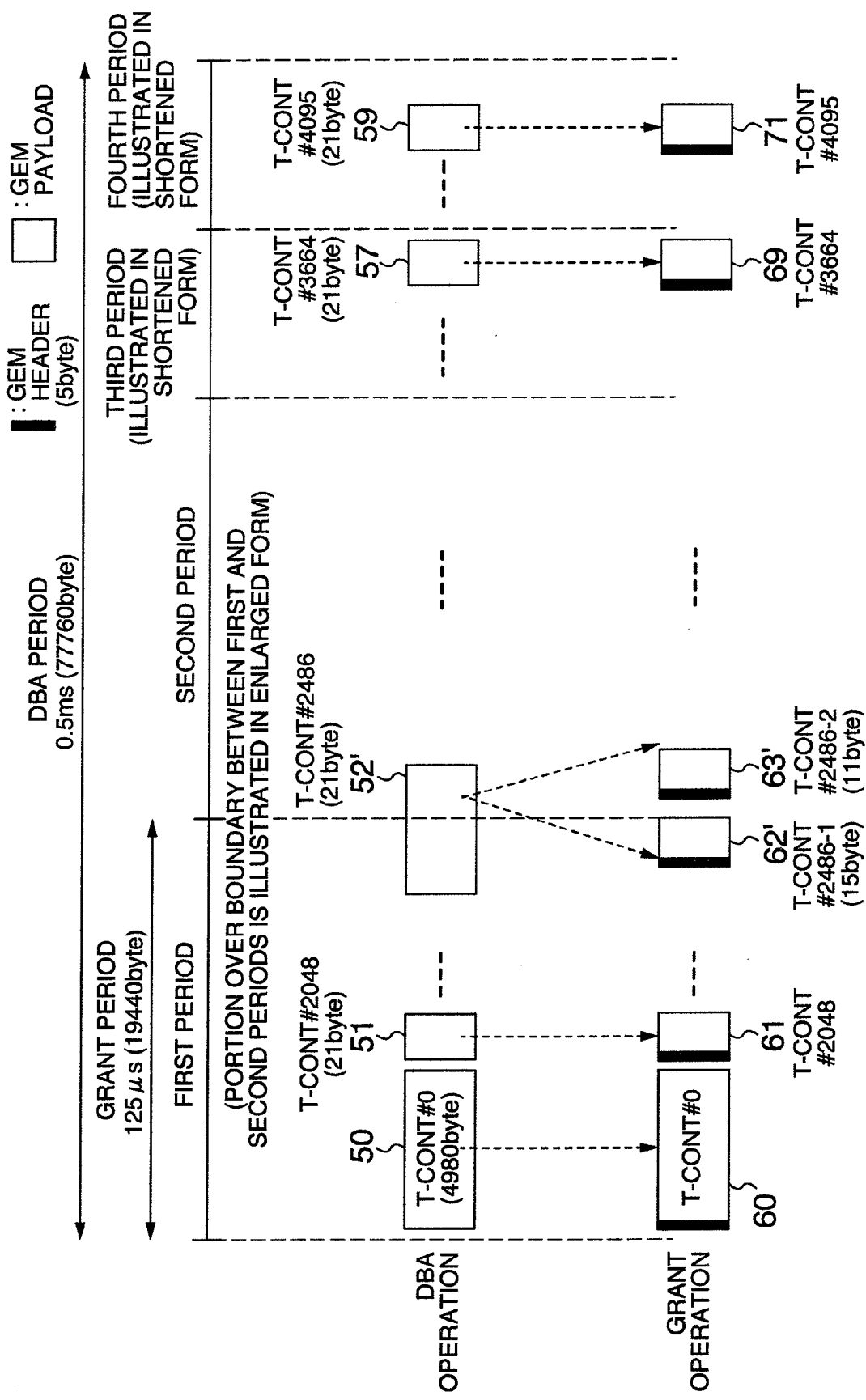
FIG. 11 is an explanatory diagram showing an example of the operation of the PON according to the present invention.

FIG. 11 is an explanatory diagram showing an example of the operation of the PON according to the present invention. FIG. 11 illustrates the state where the data transmission timings of the T-CONTs are assigned by the OLT 1. In FIG. 11, a portion extending over the first grant period and the second grant period is shown in an enlarged form for detailed explanation.

In FIG. 11, in the same manner as in the state previously shown in FIG. 5, fragmentation occurs when data assigned to the T-CONT #2486 are transmitted, and the data are divided and allocated to the first grant period and the second grant period. According to the present invention, as described previously, the transmission timing decision unit 801 gives the T-CONT a grant in which a byte length of 21+5=26 bytes in consideration of 5 bytes of a GEM header to be attached due to the occurrence of fragmentation is allocated to the T-CONT. That is, when the present invention is applied to the same state as the state (see FIG. 5) of the background-art PON described previously, in DBA the OLT 1 decides 21 bytes as the data length 52 to be granted to the T-CONT #2486 (see the byte length whose T-CONT-ID is 2486 in FIG. 9). In the OLT 1, however, due to the fragmentation detection unit 800 which has detected the fragmentation, the transmission timing decision unit 801 operates to allocate data 62 of 15 bytes to the first grant period and data 63 of the rest 26−15=11 bytes including an additionally attached GEM header to the second grant period (see the Start and End values whose T-CONT-ID is 2486 at the tail of the first grant period and the Start and End values whose T-CONT-ID is 2486 at the head of the second grant period in FIG. 10). According to the present invention, therefore, the state where, of the 16 bytes of the data, only 11 bytes can be transmitted due to fragmentation as in the background-art PON can be avoided so that all the 16 bytes of the data can be transmitted surely. Thus, deterioration of communication quality can be avoided.

Further, the configuration and operation of the PON according to the present invention will be described in detail with reference to the drawings.

Figure 12:
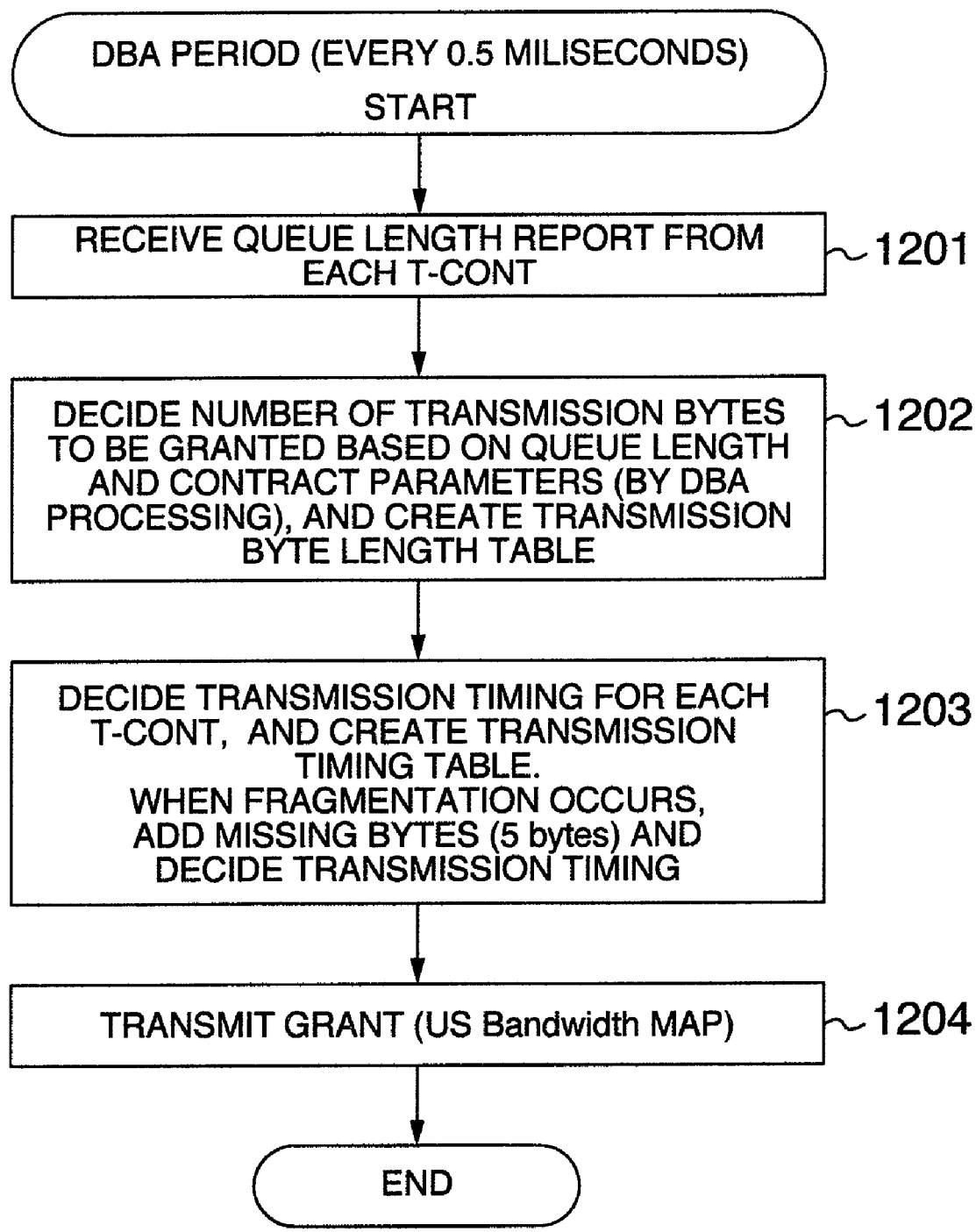
FIG. 12 is an operation flow diagram showing an example of the operation of the OLT control unit according to the present invention.

FIG. 12 is an operation flow chart showing an example of the operation of the control unit 700 in the OLT 1.

First, the data transmission grant unit 709 of the control unit 700 receives the queue length (33 in FIG. 3 and Report in FIG. 4) designating the volume of transmission-queued data from each T-CONT of each ONU 10 in a DBA period (Step 1201). Based on the received queue length and contract parameter values set by the monitoring control unit in advance, the data volume to be granted to each T-CONT of each ONU 10 in the next 0.5-milisecond DBA period is decided in byte length (by DBA processing), and the decided byte length is stored in the allocated byte length table 802 of the storage unit 710 (Step 1202).

Next, referring to the byte length (902 in FIG. 9) stored in the allocated byte length table 802, the data transmission grant unit 709 decides a time slot in which each T-CONT should transmit data in each grant period, and creates values of the transmission timing table 803. On this occasion, the fragmentation detection unit 800 detects the existence of fragmentation in each T-CONT. For each T-CONT where fragmentation will occur, the transmission timing decision unit 801 decides a time slot (or decides transmission timing or grant) in which the T-CONT should transmit data in a grant period based on the byte length obtained by adding 5 bytes of a GEM header additionally attached to a packet divided due to the fragmentation, and creates values of the transmission timing table 803 (Step 1203).

In accordance with the decided contents, the transmission timing decision unit 801 transmits each ONU 10 a transmission grant message including a grant instruction 22 (US Bandwidth MAP) so as to notify the ONU 10 of the transmission timing of data (Step 1204).

Figure 13:
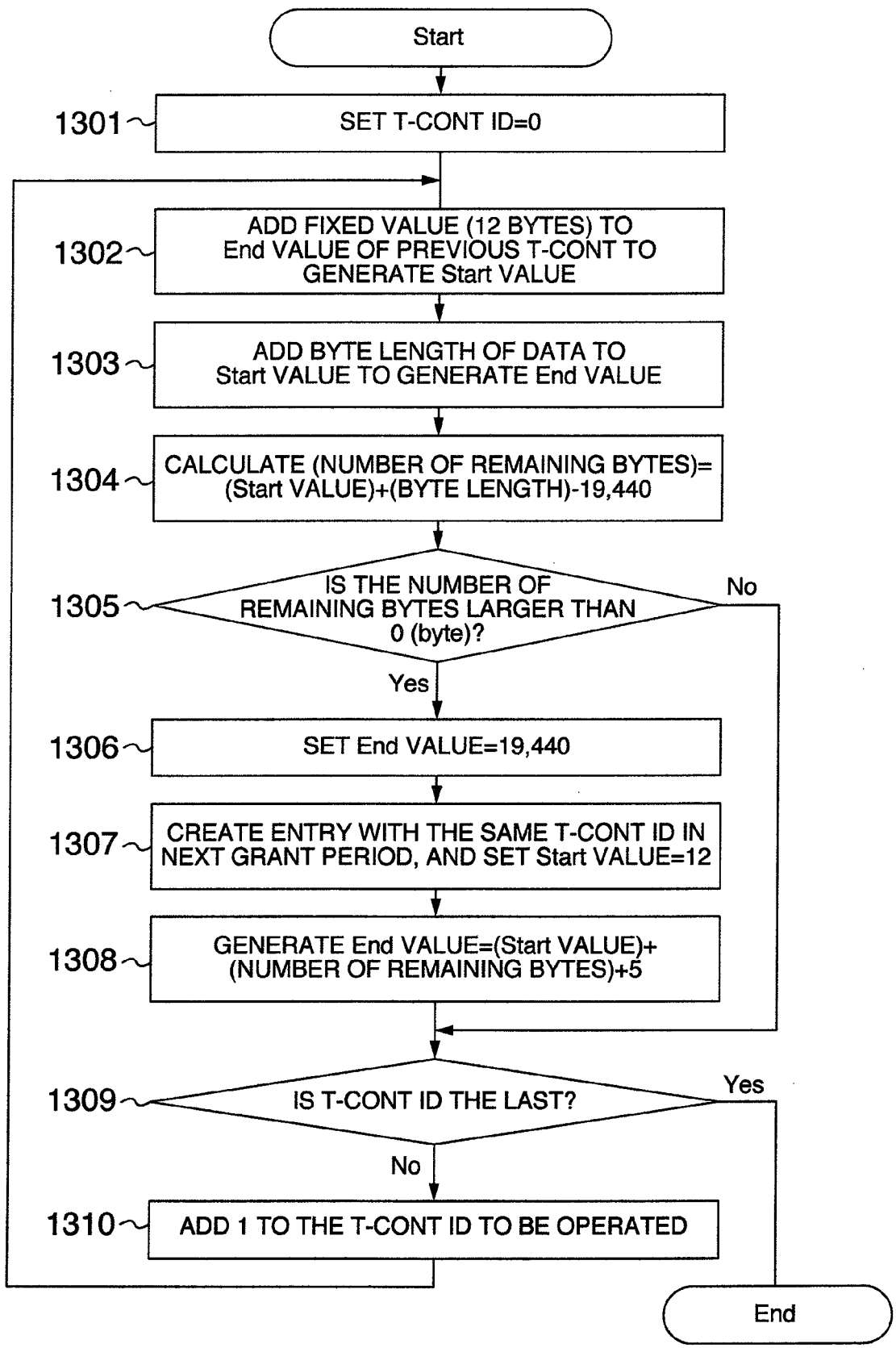
FIG. 13 is an operation flow diagram showing an example of the operation of time slot allocation processing.

FIG. 13 is also an operation flow chart showing an example of the operation of the control unit. In FIG. 13, the configuration of Step 1203 in FIG. 12 is illustrated in detail by way of example. That is, FIG. 13 shows in detail an example of the operation including the steps of reading the allocated byte length table 802 (FIG. 9), deciding a time slot in which each T-CONT should transmit data, and creating the transmission timing table 803 (FIG. 10).

The transmission timing decision unit 801 in this embodiment is designed to decide transmission timings of T-CONTs in a numerical order of their T-CONT-IDs so as to fill a DBA period with their data. Therefore, control is started at the T-CONT whose T-CONT-ID is 0 (Step 1301).

First, with reference to the transmission timing table 803, the Start value of the T-CONT is obtained by adding up the length of the burst overhead (36 in FIG. 3) and the length of the guard time (38 in FIG. 3) and adding the result to the End value given to the preceding T-CONT. Here the value of the added lengths is a fixed value set in the PON in advance. The value is set as 12 bytes in this embodiment. The obtained Start value is stored in the transmission timing table 803 (Step 1302). When the T-CONT is placed at the head of any grant period, the Start value is set not as the value obtained by adding 12 bytes to the End value of the preceding T-CONT but as 12 which is obtained by adding 12 bytes to 0 byte indicating the head of the grant period.

Next, the transmission timing decision unit 801 obtains an End value by adding the byte length 902 obtained from the allocated byte length table 802 to the obtained Start value (Step 1303). The transmission timing decision unit 801 then calculates the number of remaining bytes in the grant period (Step 1304). Specifically, the number of bytes of data that can be transmitted in the grant period is subtracted from the obtained End value. In this embodiment, as described previously, the upstream signal rate is about 1.2 Gbit/sec. Therefore, the number of bytes of data that can be transmitted in a 125-microsecond grant period is 19,440 bytes. This value is a fixed value set in the PON. The value depends on how high signal rate and how long grant period are selected for use.

Subsequently, the fragmentation detection unit 800 detects the existence of fragmentation. Specifically, the fragmentation detection unit 800 checks whether the number of remaining bytes calculated in Step 1304 reaches a predetermined value or not (Step 1305). If the number of remaining bytes is positive, it can be concluded that fragmentation will occur due to the data volume exceeding the boundary of the grant period (frame) placed at 19,440 bytes. On this occasion, the transmission timing decision unit 801 performs the following processing to begin again the decision of the transmission timing using the byte length obtained by addition of 5 bytes for a GEM header to be additionally attached due to the fragmentation. On the other hand, when the number of remaining bytes is 0 or negative in the aforementioned check, there is no fear that fragmentation will occur. Thus, processing for the next T-CONT is performed.

The decision of the transmission timing is done again in the following procedure. First, the End value for the T-CONT in question under calculation is set as 19,440 corresponding to the number of bytes of data that can be transmitted in the grant period (Step 1306). Thus, the transmission timing of the first one of the packets divided due to the fragmentation is decided. Subsequently the transmission timing of the remaining data of the divided packets is decided. Specifically, the transmission timing is decided so that the remaining data can be transmitted at the head of the next grant period. Therefore, an entry for the same T-CONT-ID associated with the next grant period is created in the transmission timing table 803 (i.e. an entry whose T-CONT-ID is 2486 is created in the example described previously), and the Start value thereof is set as the value which should be given to a T-CONT at the head of a grant period). In this embodiment, the Start value is set at 12 as described previously (Step 1307). The End value of the same entry is obtained by adding up the Start value, the number of bytes of the rest of the divided data in the T-CONT, and 5 bytes for the newly attached GEM header length (Step 1308). That is, here, addition of 5 bytes corresponding to the GEM header to be additionally attached due to the fragmentation is completed.

After that, it is judged whether the T-CONT whose transmission timing has been calculated is the last T-CONT or not (Step 1309). When the T-CONT is the last, the processing for creating the transmission timing table 803 is terminated. When the T-CONT is not the last, 1 is added to the T-CONT-ID (Step 1310), and the aforementioned processing is performed again.

The aforementioned operation will be explained with the T-CONTs also shown in FIGS. 9-11 by way of example. Since the End value of the T-CONT #2485 is 19,413, the Start value of the T-CONT #2486 is obtained as 19,426 by adding 12 bytes to the End value. Subsequently, since the byte length of the T-CONT #2486 stored in the allocated byte length table 802 is 21 bytes, the End value is calculated as 19,447 by adding the 21 bytes to the Start value. Here, the number of the remaining bytes is calculated as 19447−19440=7 bytes, which is a positive value. Thus, it is concluded that fragmentation will occur when the data of the T-CONT #2486 are transmitted. Accordingly, the End value of the first one of divided packets, which will be transmitted in the first grant period, is set as 19,440. Further, another entry for the T-CONT #2486 is created in the second grant period in the transmission timing table 803 so that the second one of the divided packets can be transmitted in the second grant period. The Start value of this entry is set as 12. As for the End value thereof, 23 is generated by adding 6 bytes for the number of untransmitted bytes in the T-CONT #2486 and 5 bytes for a GEM header to 12 bytes of the Start value. Thus, allocation of 26 bytes consisting of 15 bytes in the first grant period and 11 bytes in the second grant period is completed so that 16 bytes of the original data can be transmitted even if fragmentation occurs.

In the background-art PON, fragmentation also occurs over the second and third grant periods in the T-CONT #3076. In the PON according to the present invention, however, fragmentation does not occur, but the entry of the T-CONT #3076 is present only in the third grant period. This reason will be described below. As a result of addition of 5 bytes for the T-CONT #2486, bytes allocated to the subsequent T-CONTs are shifted sequentially. Thus, the End value of the T-CONT #3075 is 19,427. At this time, only an area of 19440−19427=13 bytes remains in the second grant period. A burst overhead and a guard time corresponding to 12 bytes must be provided after End of any packet as described previously. In consideration of these bytes, there remains one byte, where even a GEM header of 5 bytes cannot be transmitted. Accordingly, the remaining 13 bytes of the second grant period is set as a blank area, and the transmission timing of the T-CONT #3076 is assigned in the third grant period. That is, in the PON according to the present invention, even if a negative value is detected in a T-CONT in Step 1305 of FIG. 13, when the number of bytes is not larger than a predetermined value (12+5=17 in this embodiment), fragmentation is not performed, but the transmission timing of the T-CONT is delayed to the next grant period.

In the background-art PON, due to the influence of a GEM header generated due to fragmentation, there may occur a phenomenon that a part of transmission data decided by DBA cannot be transmitted or is waited until the next DBA period, thereby causing a delay. According to the present invention, deterioration of communication quality caused by such a phenomenon can be avoided.

In the aforementioned embodiment, the existence of fragmentation is checked when the data transmission grant unit 709 is creating the transmission timing table 803, and 5 bytes for a GEM header to be additionally attached due to the fragmentation is added in the same DBA period. An alternative method can be also considered as follows. That is, transmission timings are assigned (i.e. grants are issued) without adding the number of bytes to be attached due to fragmentation. When upstream signals are received based on grants, the OLT or each ONU detects the number of bytes of data that could not be transmitted due to fragmentation. The data that could not be transmitted in a DBA period is transmitted in the next DBA period. In this case, a delay of data occurs as described previously. The configuration or the control method described below may be used for services which do not need real time performance.

The configuration and operation where another embodiment is applied to the same state as the state described in FIG. 5 will be described below.

The data volume granted to the T-CONT #2486 in a first DBA period is 21 bytes obtained by adding 5 bytes for a GEM header to 16 bytes of data. The data are divided into 15 bytes (5 bytes for a GEM header and 10 bytes for data) in the first grant period and 6 bytes (5 bytes for a GEM header and 1 byte for data) in the second grant period due to fragmentation. Correspondingly to the GEM header, 5 bytes of data cannot be transmitted in this DBA period. In the OLT according to the present invention, in the next DBA period, 5 bytes of data that could not be transmitted in the preceding DBA period are granted as a packet of the T-CONT #2486 attached with a GEM header, as well as 21 bytes (5 bytes for a GEM header and 16 bytes for data) as an essential packet granted to the T-CONT #2486 in this DBA period. That is, a 10-byte packet consisting of a GEM header of 5 bytes and data of 5 bytes will be transmitted in the next DBA period.

FIG. 14 is a memory configuration diagram showing another configuration example of the allocated byte length table used in this embodiment. FIG. 14 is different from the aforementioned memory configuration diagram (FIG. 9) in the following point. That is, an additional byte length 1601 in which data untransmitted due to fragmentation in a previous DBA period and a GEM header have been taken into account is also stored so that the untransmitted data can be transmitted in a present DBA period. Specifically, an additional byte length of 10 bytes consisting of 5 bytes for a GEM header and 5 bytes for data untransmitted in a previous DBA period is placed in each of the T-CONT #2486 and the T-CONT #3076 where fragmentation occurred in the previous DBA period. Data by which the data (5 bytes) untransmitted in the previous DBA period will be transmitted in the present DBA period should be dealt with as another packet than a packet which will be transmitted in the present DBA originally. It is therefore necessary to provide another GEM header (5 bytes) for the untransmitted data in order to transmit the data. Thus, the additional byte length reaches 10 bytes.

FIG. 15 is a memory configuration diagram showing another configuration example of the transmission timing table used in this embodiment. FIG. 15 is different from the aforementioned memory configuration diagram (FIG. 10) in the following point. That is, an additional byte length 1601 is also stored in an allocated byte length table 802' so that data untransmitted in a previous DBA period can be transmitted in a present DBA period. Accordingly, when grants are generated for T-CONTs in grant periods in the present DBA period, the additional byte length is taken into account in each grant. The generated grants are stored in the transmission timing table 803. Specifically, a total of 31 bytes consisting of 10 bytes placed as the additional byte length and 21 bytes to be transmitted originally in the present DBA period is allocated to the T-CONT #2486, and a grant is issued for the data of 31 bytes in a grant period in the present DBA period.

Figure 16:
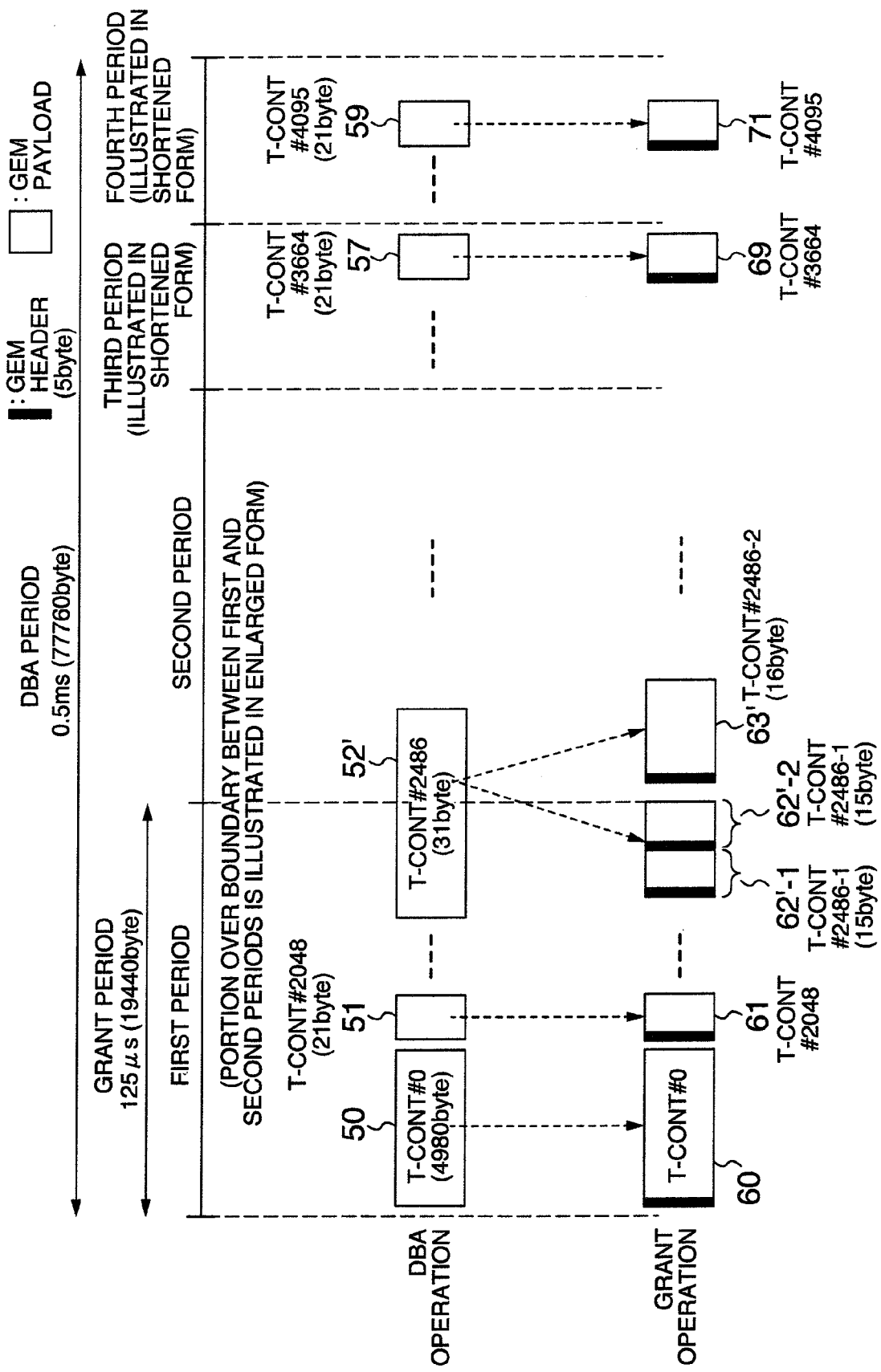
FIG. 16 is an explanatory diagram showing another example of the operation of the PON.

FIG. 16 is an explanatory diagram showing another example of the operation of the PON according to the present invention. FIG. 16 explains the state where data transmission timings of T-CONTs are assigned by the OLT 1 based on the aforementioned alternative method. Also in FIG. 16, a portion extending over the first grant period and the second grant period is shown in an enlarged form for detailed explanation. The detailed operation of the control unit 700 of the OLT 1 will be described later. The operation in which the PON according to this embodiment is used in the same state as the state shown in FIG. 5 will be described.

In the same manner as in the previous embodiment, the control unit 700 reads out the allocated byte length table 802' and operates so as to decide a grant for each T-CONT and create the transmission timing table 803. In the example of FIG. 16, of 31 bytes (52' in FIG. 16) of the T-CONT #2486, 16 bytes (T-CONT #2486-1 in FIG. 16) with a Start value of 19,426 and an End value of 19,440 are allocated to the first grant period, and 15 bytes (T-CONT #2486-2 in FIG. 16) with a Start value of 12 and an End value of 26 are allocated to the second grant period. Control is made so that the 16 bytes in the first grant period contains 10 bytes of additional data (62'-1 in FIG. 16) and 6 bytes of a first packet (62'-2 in FIG. 16) of packets divided due to fragmentation while the 15 bytes in the second grant period contains a second packet (63' in FIG. 16) of the packets divided due to fragmentation. The 10 bytes of additional data consists of 5 bytes of data that could not be transmitted in previous DBA and 5 bytes of a GEM header. The 6 bytes of the first packet consists of 1 byte of data to be transmitted in present DBA and 5 bytes of a GEM header. The second packet consists of 5 bytes of a GEM header and 10 bytes of data. In the aforementioned description, fragmentation occurs in the data of the T-CONT #2486 again in the present DBA period so that 5 bytes of data cannot be transmitted. In an ordinary operation, however, the volume of transmission-queued data shown by the queue length 33 from each ONU 10 (T-CONT) varies dynamically. Accordingly, the position where a grant is generated differs from one DBA period to another in spite of one and the same T-CONT. For this reason, fragmentation hardly occurs in one and the same T-CONT over a plurality of consecutive DBA periods. There is no fear that the state where data cannot be transmitted due to the fragmentation continues long enough to become a practical problem.

Figure 17:
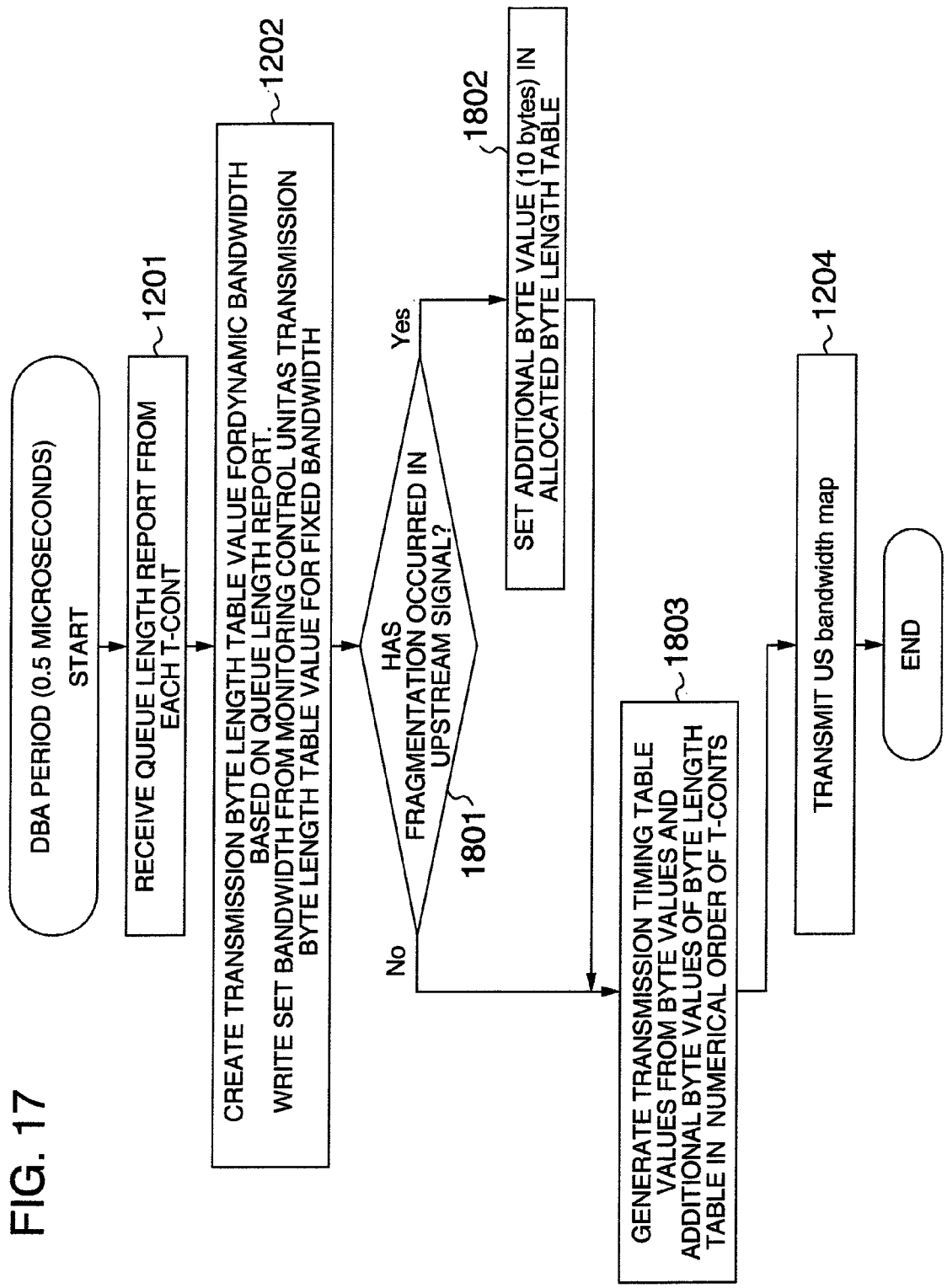
FIG. 17 is an operation flow diagram showing another example of the operation of the OLT control unit.

FIG. 17 is an operation flow diagram showing another example of the operation of the control unit 700 of the OLT 1. FIG. 17 shows the operation in which the aforementioned alternative method is executed.

First, the data transmission grant unit 709 of the control unit 700 receives the queue length (33 in FIG. 3 and Report in FIG. 4) designating the volume of transmission-queued data from each T-CONT of each ONU 10 in a DBA period (Step 1201). Based on the received queue length and contract parameter values set by the monitoring control unit in advance, the data volume to be granted to each T-CONT of each ONU 10 in the next 0.5-milisecond DBA period is decided in byte length (by DBA processing), and the decided byte length is stored in the allocated byte length table 802 of the storage unit 710 (Step 1202).

Next, by using a method etc. which will be described later, the fragmentation detection portion 800 judges whether fragmentation occurs or not in each upstream signal (Step 1801). Here, when fragmentation occurs, the value of 10 bytes (5 bytes prevented from being transmitted due to the fragmentation and 5 bytes for a GEM header) is stored in an additional byte length 1601 of the allocated byte length table 802' corresponding to the T-CONT where the fragmentation occurs.

After that, referring to the byte length (the sum of the byte length 902 and the additional byte length 1601 in FIG. 14) stored in the allocated byte length table 802, the data transmission grant unit 709 decides a time slot (and issues a grant) in which each T-CONT should transmit data in each grant period, and creates values of the transmission timing table 803 (Step 1803). The time slot is decided almost in the same manner as that in the operation described in FIG. 5, but 5 bytes are not added in the same DBA period when fragmentation occurs, as in the previous embodiment. The additional byte length is instead stored in the allocated byte length table 802', and a grant is issued in consideration of the additional byte length in the next DBA period.

In accordance with the decided contents, the transmission timing decision unit 801 transmits each ONU 10 a transmission grant message including a grant instruction 22 (US Bandwidth MAP) so as to notify the ONU 10 of the transmission timing of data (Step 1204).

Figure 18:
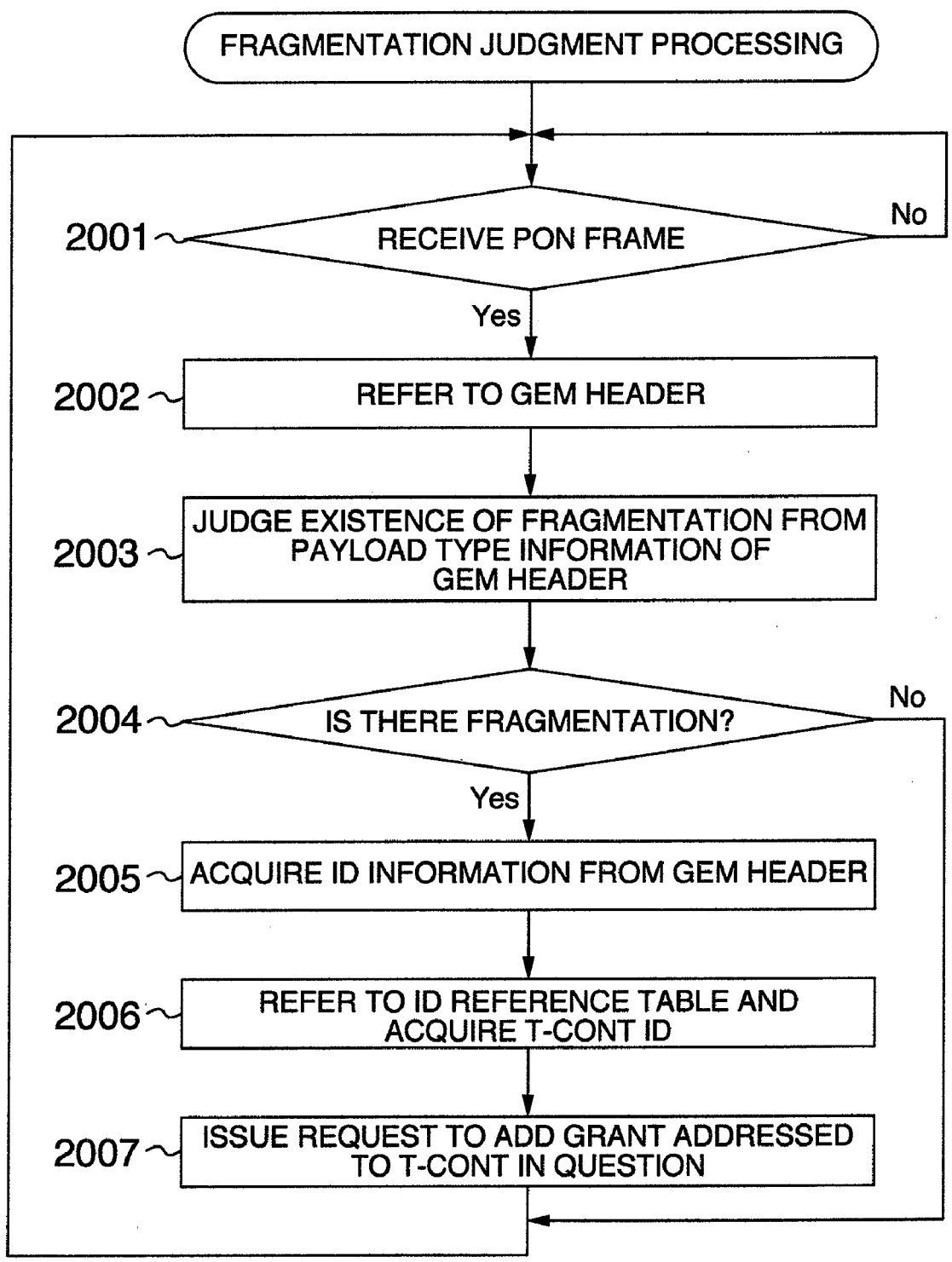
FIG. 18 is an operation flow diagram showing an example of fragmentation detection according to the present invention.

FIG. 18 is an operation flow diagram showing an example of fragmentation judgment processing executed by the PON according to the present invention.

When a PON frame (burst data 37 in FIG. 3) is received (Step 2001), a header (GEM header 34 in FIG. 3) of the frame is referred to (Step 2002). It can be judged from payload type information in the header whether the frame is in the middle of an Ethernet (registered trademark) frame or at an end thereof. In this manner, the existence of fragmentation is checked (Step 2004). Specifically, the existence of fragmentation can be determined if the frame is in the middle of an Ethernet frame. When the existence of fragmentation is determined, Port-ID information in the header is acquired (Step 2005). With reference to an ID reference table (not shown), a corresponding T-CONT ID is acquired (Step 2006). A request to add a grant addressed to a T-CONT corresponding to the acquired T-CONT ID is made (Step 2007).

Figure 19:
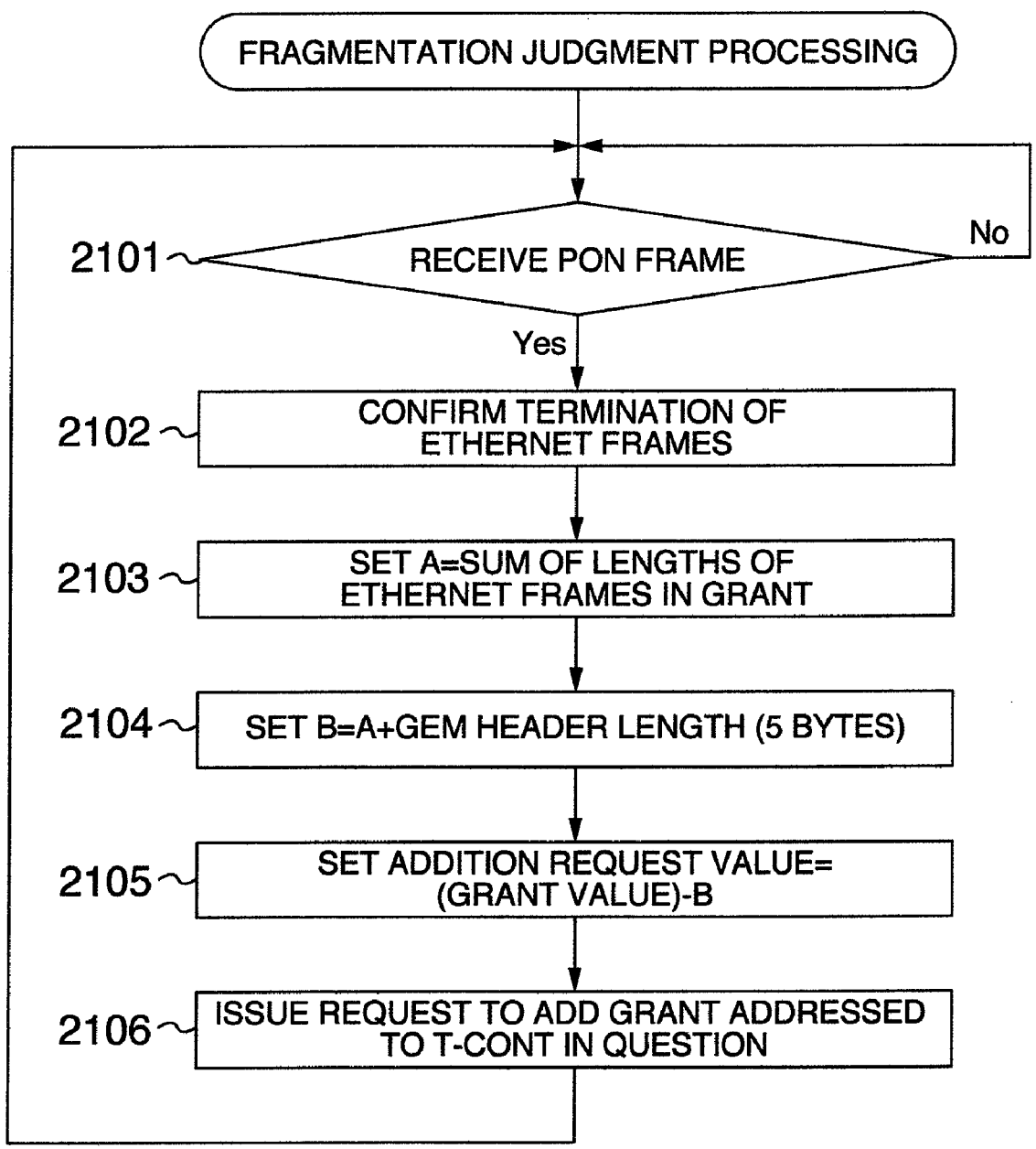
FIG. 19 is an operation flow diagram showing another example of fragmentation detection.

FIG. 19 is also an operation flow diagram showing another embodiment of the fragmentation judgment processing.

According to this method, the byte length allocated to each T-CONT by a grant, the number of Ethernet frames belonging to the same T-CONT and the total byte length of the Ethernet frames are counted when GEM headers are deleted from upstream signals in the OLT and the Ethernet frames obtained thus are transferred to the next stage. The byte length, the number of Ethernet frames and the total byte length of the Ethernet frames are compared to judge the occurrence of fragmentation for each T-CONT.

An example will be shown. Assume that a grant of 21 bytes is given to a certain T-CONT with a period of 0.5 miliseconds. Further assume that the number of Ethernet frames belonging to the T-CONT is counted as 1 during one 0.5-milisecond period, and the total byte length of the Ethernet frame is 16 bytes. In this case, it is concluded that a GEM header of 5 bytes has been attached to one Ethernet frame of 16 bytes, and the upstream transfer of the Ethernet frame has been completed without fragmentation due to the grant of 21 bytes. On the other hand, assume that in spite of a grant of 21 bytes given in the same manner, the number of Ethernet frames is counted as 2 during one period, and the total byte length of the Ethernet frames is 11 bytes. In this case, it can be concluded that 5-byte GEM headers (totally 10 bytes) have been attached to the two Ethernet frames respectively, and the grant of 21 bytes fragmented into two has been given. Here, a missing bandwidth is 5 bytes, which can be obtained by subtracting 5 bytes for the byte length of one 5-byte GEM header and 11 bytes for the counted total number of bytes of the Ethernet frames from 21 bytes of the granted byte length. A bandwidth required for the 5-byte Ethernet signal is additionally provided when a subsequent grant is issued.

Specifically, when a PON frame is received (Step 2101), termination of Ethernet frames is confirmed (Step 2102). Here, frame lengths of Ethernet frames in a DBA period are summed up (Step 2103). Further, 5 bytes for a GEM header length is added to the total frame length (Step 2104). A value is obtained by subtracting the number of bytes obtained in Step 2104 from the number of bytes of a granted bandwidth (Step 2105). The obtained value designates a bandwidth which has been additionally consumed due to fragmentation. A request to add a grant corresponding to the value is made in subsequent DBA processing (Step 2106).

Figure 20:
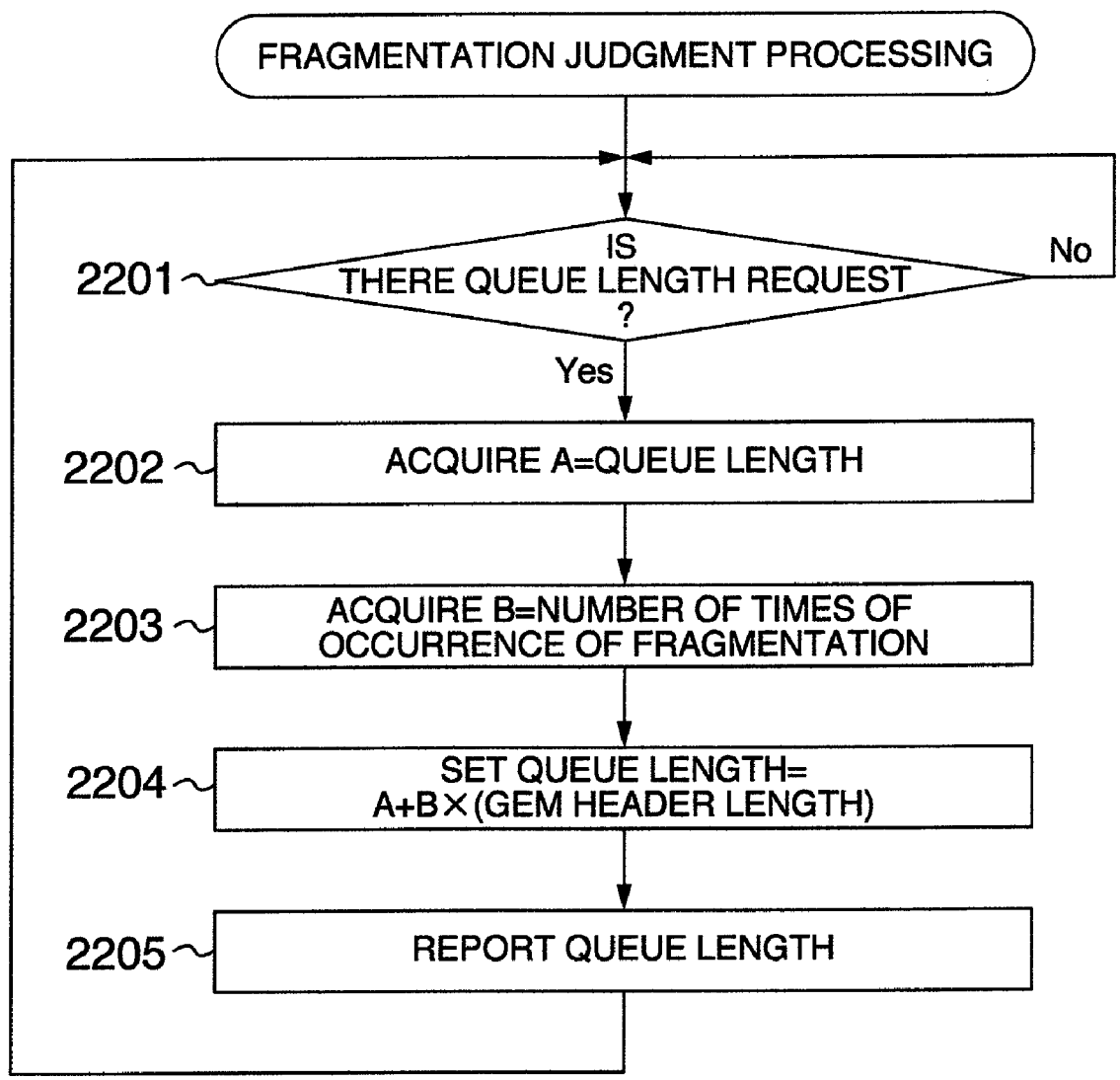
FIG. 20 is an operation flow diagram showing further another example of fragmentation detection.

FIG. 20 is also an operation flow diagram showing another embodiment of the fragmentation judgment processing. This embodiment can be implemented as follows. That is, each ONU has a function of storing the number of times of occurrence of fragmentation when the ONU maps its own data onto a grant given thereto and transmits the mapped data to the OLT, and the OLT has a function of reading out the number of times of occurrence of fragmentation stored in the ONU.

Each ONU 10 monitors a queue length send request from the OLT 1 (Step 2201). On receiving the send request, the ONU 10 acquires queue length (A) corresponding to the volume of transmission-queued data (Step 2202). In this embodiment, each ONU 10 also has a fragmentation judgment unit (not shown) to acquire the number of times of occurrence of fragmentation (B) (Step 2203). In a queue length addition unit (not shown), the product of the number of times of occurrence of fragmentation B and the header length is added to the real queue length A as queue length information (Step 2204). A PON frame generation unit is notified of the value of the queue length information (Step 2205). Due to a response from the ONU 10, the OLT can know the number of times of occurrence of fragmentation. When fragmentation occurs, the OLT issues a grant to allow the ONU 10 to transmit missing bytes caused by the fragmentation in a subsequent DBA period.

The configuration and operation of the aforementioned alternative method is effective not only in the case where fragmentation occurs over the boundary between grant periods but also in the case where fragmentation occurs due to an change of packet length of an upstream signal from each T-CONT. An example will be shown. VoIP is allowed to change a voice encoding method or an encoding period in accordance with negotiation between terminals. Assume that the OLT estimates a packet of 16 bytes, but the length of the packet is changed to 32 bytes by negotiation between terminals accommodated in an ONU. In this case, the packet cannot be put in a grant of 21 bytes given originally. Thus, fragmentation may occur. In such a case, in the configuration and operation of the embodiment described at the beginning, fragmentation caused by the aforementioned fact cannot be detected because the OLT monitors only extending over the boundary between grant periods when the OLT allocates bandwidths. In the alternative configuration and method described later, the fragmentation can be detected and processed, for example, by (a) a method in which the OLT refers to a payload type in a received GEM header, (b) a method in which the OLT compares a total value of received payload lengths with a given grant length, or (c) a method in which each ONU detects occurrence of fragmentation, adds GEM header lengths corresponding to the number of times of occurrence of fragmentation to a queue length and transmits the queue length to the OLT so as to report the number of times of occurrence of fragmentation to the OLT. Thus, the occurrence of fragmentation caused by the aforementioned fact can be detected so that optimum bandwidths can be allocated.

In the PON and the operating method thereof according to the present invention, as described above in detail with reference to the drawings, no lack of bandwidth appears in spite of occurrence of fragmentation. That is, there is no fear that the communication quality deteriorates. It is therefore possible to provide satisfactory communication services to users.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A passive optical network system comprising:
a master station;
a plurality of slave stations; and
an optical fiber network including an optical splitter and a plurality of optical fibers;
wherein the master station and the plurality of slave stations are connected via the optical fiber network, and the master station decides volumes and timings of signals to be transmitted from the plurality of slave stations to the master station individually in accordance with requests from the plurality of slave stations, and receives the signals from the plurality of slave stations multiplexed on the optical fiber network;
wherein the master station includes:
a bandwidth control unit which decides, for every first period of plural first periods, a volume of a transmission signal to be granted to each slave station in said every first period in which bandwidth assignment calculation is executed based on the requests from the plurality of slave stations;
a transmission timing control unit which decides a transmission timing in which the slave station should transmit the signal in each one of a plurality of second periods with a same periodic frame length and composes the first period in accordance with the volume of the signal decided by the transmission timing control unit; and
a control unit by which, when an en bloc signal granted to any one of the plurality of slave stations by the bandwidth control unit is fragmented and to be transmitted over the plurality of second periods by the transmission timing control unit, the bandwidth control unit and/or the transmission timing control unit are controlled based on a volume of a signal and overhead to be attached due to the fragmentation, so that the granted signal can be transmitted within the first period.

2. A passive optical network system according to claim 1 wherein:
the first period is a period in which the master station executes Dynamic Bandwidth Allocation (DBA) for each of the plurality of slave stations;
the second period is a period in which the master station indicates grant to each of the plurality of slave stations; and
the volume of a signal and overhead to be attached due to the fragmentation is a volume of GPON Encapsulation Method (GEM) header.

3. A passive optical network system comprising:
a master station;
a plurality of slave stations; and
an optical fiber network including an optical splitter and a plurality of optical fibers;
wherein the master station and the plurality of slave stations are connected via the optical fiber network, and the master station decides volumes and timings of signals to be transmitted from the plurality of slave stations to the master station individually in accordance with requests from the plurality of slave stations, and receives the signals from the plurality of slave stations multiplexed on the optical fiber network;
wherein the master station includes:
a bandwidth control unit which decides, for every first period of plural first periods, a volume of a transmission signal granted to each of the plurality of slave stations in said every first period in which bandwidth assignment calculation is executed based on a request from the slave station;
a transmission timing control unit which decides a transmission timing in which the slave station should transmit the signal in each one of a plurality of second periods with a same periodic frame length and composes the first period in accordance with the decided volume of the signal; and
a control unit controls the bandwidth control unit and/or the transmission timing control unit when an en bloc signal granted to any one of the plurality of slave stations by the bandwidth control unit is fragmented and to be transmitted over the plurality of second periods by the transmission timing control unit and if a signal and overhead to be attached due to the fragmentation prevents a part of the granted transmission signal from being transmitted, so that the signal prevented from being transmitted can be also transmitted in a subsequent first period.

4. A method for operating a passive optical network system in which a master station and a plurality of slave stations are connected via an optical fiber network including an optical splitter and a plurality of optical fibers, and the master station decides volumes and timings of signals to be transmitted from the plurality of slave stations to the master station individually in accordance with requests from the plurality of slave stations, and receives the signals from the plurality of slave stations multiplexed on the optical fiber network; the method comprising:
using the master station to decide, for every first period of plural first periods, a volume of a transmission signal granted to each of the plurality of slave stations in said every first period in which bandwidth assignment calculation is executed based on the request from the slave stations; and
deciding a transmission timing in which the slave station should transmit the signal in each one of a plurality of second periods with a same periodic frame length and composing the first period in accordance with the decided volume of the signal; and
when an en bloc signal granted to any one of the plurality of slave stations cannot be capsulated in one of the second period and is fragmented and to be transmitted over two of the second periods, controlling the timing assigned for the signal in the plurality of second periods based on a volume of a signal and overhead to be attached due to the fragmentation, so that the granted signal can be transmitted within the first period.

5. A method for operating a passive optical network system in which a master station and a plurality of slave stations are connected via an optical fiber network including an optical splitter and a plurality of optical fibers, and the master station decides volumes and timings of signals to be transmitted from the plurality of slave stations to the master station individually in accordance with requests from the plurality of slave stations, and receives the signals from the plurality of slave stations multiplexed on the optical fiber network; the method comprising:
using the master station to decide, for every first period of plural first periods, a volume of a transmission signal granted to each of the plurality of slave stations in said every first period in which bandwidth assignment calculation is executed based on the request from the slave stations; and
deciding a transmission timing in which the slave station should transmit the signal in each one of a plurality of second periods with a same periodic frame length and composing the first period in accordance with the decided volume of the signal; and when an en bloc signal granted to any one of the plurality of slave stations cannot be capsulated in one of the second period and is fragmented and to be transmitted over two of the second periods, if a signal and overhead to be attached due to the fragmentation prevents a part of the granted transmission signal from being transmitted, transmitting the signal prevented from being transmitted additionally in a subsequent first period.

* * * * *